US010009287B2

(12) United States Patent
Djukic et al.

(10) Patent No.: US 10,009,287 B2
(45) Date of Patent: Jun. 26, 2018

(54) HIERARCHICAL SOFTWARE-DEFINED NETWORK TRAFFIC ENGINEERING CONTROLLER

(71) Applicant: Huawei Technologies Co., Ltd., Shenzhen (CN)

(72) Inventors: Petar Djukic, Ottawa (CA); Xu Li, Nepean (CA); Hang Zhang, Nepean, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/141,077

(22) Filed: Dec. 26, 2013

(65) Prior Publication Data

US 2015/0188837 A1 Jul. 2, 2015

(51) Int. Cl.
*G06F 15/173* (2006.01)
*H04L 12/915* (2013.01)
(Continued)

(52) U.S. Cl.
CPC .......... *H04L 47/785* (2013.01); *H04L 41/044* (2013.01); *H04L 41/0896* (2013.01);
(Continued)

(58) Field of Classification Search
CPC ................. H04L 45/04; H04L 45/64
(Continued)

(56) References Cited

U.S. PATENT DOCUMENTS

| 2009/0161541 A1* | 6/2009 | Harhira | H04L 12/5695 |
| | | | 370/230.1 |
| 2013/0250770 A1* | 9/2013 | Zou | H04L 47/19 |
| | | | 370/238 |

(Continued)

FOREIGN PATENT DOCUMENTS

| CN | 103051565 A * | 4/2013 |
| EP | 1406423 A1 | 4/2004 |
| WO | 2013109137 A1 | 7/2013 |

OTHER PUBLICATIONS

Danna, Emilie, et al., "A Practical Algorithm for Balancing the max-min Fairness and Throughput Objectives in Traffic Engineering," 2012 Proceedings IEEE Infocom, pp. 846-854.

(Continued)

*Primary Examiner* — Tauqir Hussain
(74) *Attorney, Agent, or Firm* — Slater Matsil, LLP

(57) ABSTRACT

Hierarchical Software Defined Network (SDN) architectures can be used to reduce complexity of traffic engineering in large or diverse network environments. In hierarchical SDN architectures, a network is sub-divided into multiple regions, and each region is assigned to a different SDN controller. Network status information is collected and consolidated at a regional level, and fed upstream through the SDN control plane until it reaches a root SDN controller. The root-SDN controller computes cost-based parameters, which are distributed to regional SDN controllers for local provisioning. The cost-based parameters can include Lagrangian variables estimations or other parameters that constrain regional traffic (Continued)

engineering optimization in a manner that advances global traffic engineering objectives.

20 Claims, 14 Drawing Sheets

(51) Int. Cl.
    *H04L 12/911* (2013.01)
    *H04L 12/24* (2006.01)
    *H04L 12/26* (2006.01)

(52) U.S. Cl.
    CPC .............. *H04L 43/04* (2013.01); *H04L 43/06* (2013.01); *H04L 47/782* (2013.01); *H04L 43/0817* (2013.01)

(58) Field of Classification Search
    USPC ........................................................ 709/226
    See application file for complete search history.

(56) References Cited

U.S. PATENT DOCUMENTS

| | | |
|---|---|---|
| 2013/0329601 A1 | 12/2013 | Yin et al. |
| 2015/0163151 A1* | 6/2015 | Li .................... H04L 47/2441 370/236 |
| 2015/0181317 A1* | 6/2015 | Yin .................... H04Q 11/0062 398/45 |
| 2015/0229753 A1* | 8/2015 | Yoshizawa ........ H04M 1/72522 455/418 |

OTHER PUBLICATIONS

Schmid, Stefan, et al., "Exploiting Locality in Distributed SDN Control," HotSDN'13, Aug. 16, 2013, Hong Kong, China, 6 pages.
International Search Report and Written Opinion received in International Application No. PCT/CN2014/094894 dated Mar. 27, 2015, 8 pages.
Xie, H., et al., "Use Cases for ALTO with Software Defined Networks," Network Working Group Internet Draft, Jun. 19, 2012, pp. 1-26.

\* cited by examiner

HIERARCHICAL SOFTWARE-DEFINED NETWORK TRAFFIC ENGINEERING CONTROLLER

TECHNICAL FIELD

The present invention relates generally to telecommunications, and in particular embodiments, to hierarchical software-defined network traffic engineering controllers.

BACKGROUND

Software-defined networking (SDN) allows network administrators to manage network services through abstraction of lower level functionality. One strategy in SDN is to reduce network complexity by decoupling the control plane from the data plane. This can be achieved using an SDN controller to manage resource provisioning in a network, thereby alleviating much of the processing load from the switching components. Notably, centralized SDN controllers may require feedback information (e.g., buffer status information, delay statistics, etc.) from the switching devices and/or users in order to make intelligent provisioning decisions. This may create a bottle neck in large networks, as latencies involved with collecting network information and distributing provisioning instructions may significantly delay policy implementation. Moreover, traffic engineering may become processing intensive for SDN controllers servicing large networks, as the computational complexity of optimization algorithms increase significantly as additional links are added to the network. Accordingly, mechanisms for applying SDN provisioning techniques to large networks in an efficient and scalable manner are desired.

SUMMARY OF THE INVENTION

Technical advantages are generally achieved, by embodiments of this disclosure which describe methods for operating hierarchical software-defined network traffic engineering controllers.

In accordance with an embodiment, a method for operating a hierarchical SDN controller is provided. In this example, the method includes receiving regional information from one or more child SDN controllers, computing cost-based parameters in accordance with the regional information, and sending the cost-based parameters to the one or more child SDN controllers. Each of the one or more child SDN controllers are assigned a different region in a domain, and the cost-based parameters are configured to be used in performing distributed network resource allocation in each of the different regions of the domain. An apparatus for performing this method is also provided.

In accordance with another embodiment, another method for operating a hierarchical SDN controller is provided. In this example, the method includes receiving network information from one or more network elements in a region assigned to a child SDN controller, consolidating the network information into regional information, and reporting the regional information to a parent SDN controller. The method further includes receiving a set of cost-based parameters from the parent SDN controller, and allocating network resources to the network components in accordance with the set of cost-based parameters. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide resource provisioning techniques that leverage hierarchical SDN controller architectures to reduce complexity and increase utilization efficiency. The hierarchical SDN architecture subdivides a network into multiple regions (e.g., domains and zones), where a highest-tiered region (e.g., a root-domain) encompasses a hierarchical tree of lower-tiered regions (e.g., domains, zones, etc.). A dedicated SDN controller may be assigned to provision resources in each respective region. The SDN controllers collect network status information from network elements (e.g., switches, routers, access points (APs), child SDN controllers, etc.) in their respective regions, and consolidate that network status information into regional information corresponding to their specific region. This regional information is fed upstream through the SDN control plane (e.g., from child SDN controllers to Parent SDN controllers), and is further consolidated at each tier of the hierarchical structure, until all regional information is received at the root-SDN controller (e.g., the controller assigned to the root-domain). The root-SDN controller uses the regional information to compute cost-based parameters, which are distributed to the regional SDN controllers for local provisioning. The cost-based parameters may include any parameter (e.g., Lagrangian variables estimations, etc.) that serves to constrain regional traffic engineering optimization in a manner that advances global traffic engineering objectives. These and other aspects are explained in greater detail below.

Figure 1:
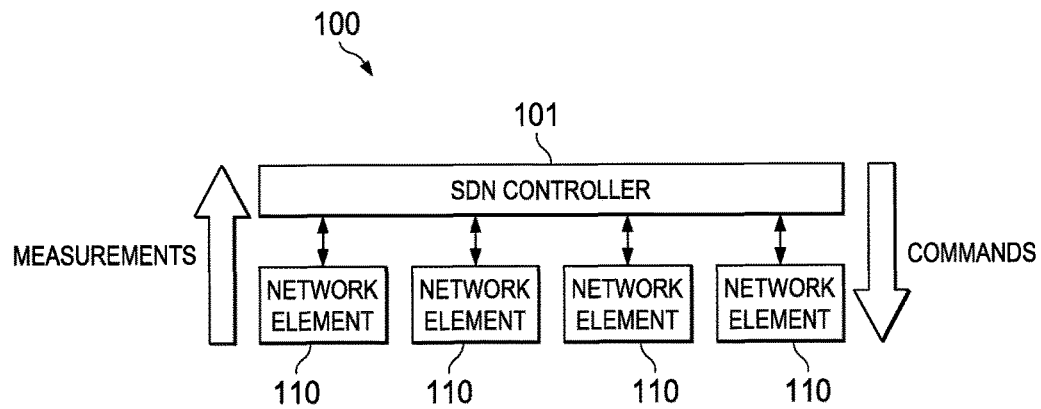
FIG. 1 illustrates a diagram of a conventional SDN architecture.
Figure 3:
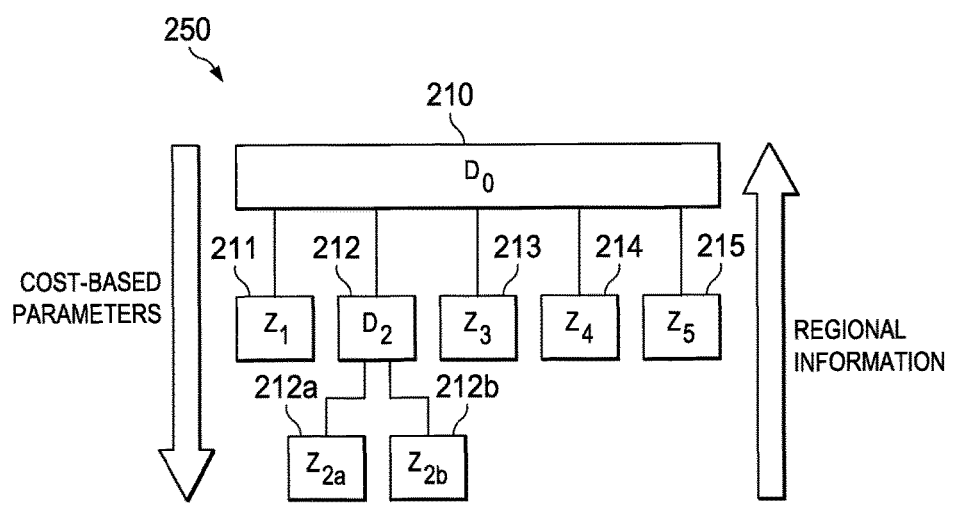
FIG. 3 illustrates a diagram of an embodiment hierarchical SDN control plane.
Figure 2:
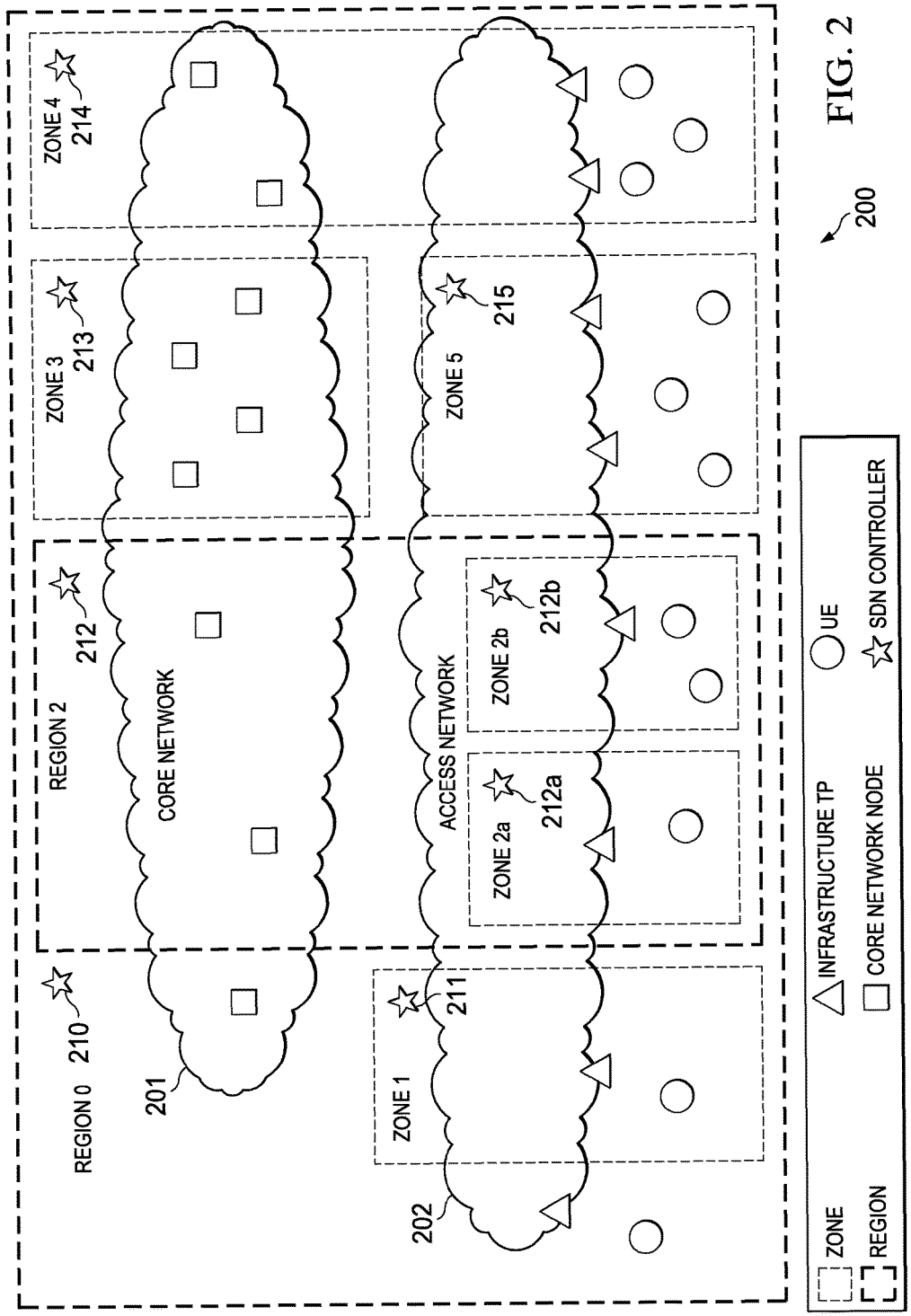
FIG. 2 illustrates a diagram of an embodiment hierarchical SDN architecture.

FIG. 1 illustrates a conventional SDN architecture 100 in which an SDN controller 101 handles resource provisioning for network elements 110. As shown, the SDN controller 101 receives measurements from the network elements 110, computes provisioning commands via an optimization algorithm, and distributes the provisioning commands to the network elements 110. The computational complexity of the optimization algorithm increases as more network elements 110 are added to the network 100, as well as when additional variables (e.g., wireless interference, path loss, etc.) are factored into the optimization algorithm. This increased complexity (along with control plane latency) may cause SDN provisioning to be unsuitable for large networks. Moreover, Aspects of this disclosure provide a hierarchical SDN architecture that addresses the efficiency, complexity, and scalability issues that plague conventional systems. FIG. 2 illustrates a hierarchical SDN architecture 200 comprising a core network 201, an access network 202, and a plurality of SDN controllers 210-215. As shown, the hierarchical SDN architecture 200 includes a root-domain (region-0) assigned to the SDN controller 210. The root-domain is sub-divided into various regions, including zone-1 assigned to the SDN controller 211, region-2 assigned to the SDN controller 212, zone-2$a$ assigned to the SDN controller 212$a$, zone-2$b$ assigned to the SDN controller 212$b$, zone-3 assigned to the SDN controller 213, zone-4 assigned to the SDN controller 214, and zone-5 assigned to the SDN controller 215. The SDN controllers 210-215 are connected via a control plane 250, which is depicted in FIG. 3. For purposes of this disclosure, the term "region" refers to any portion of a physical or virtual network that is assigned to an SDN controller. Higher-tiered regions may be loosely referred to as domains, and lower-tiered regions may be loosely referred to as zones. Regions may include physical domains/zones that correspond to geographical regions or groups of physical network components. Regions may also include virtual domains/zones that correspond to groups of traffic flows. Flows may be grouped into a virtual region based on any criteria. For example, virtual regions may include flows having a common quality of service (QoS) requirement or being associated with a common service level agreement (SLA). Alternatively, virtual regions may include flows having similar traffic characteristics, or being associated with the same end point (e.g., source, destination, etc.) or entity (e.g., same customer, etc.).

The SDN controllers 210-215 collect network status information from network elements in their respective regions. Network elements may include any data or control plane entity, including network switching elements (e.g., switches, routers, etc.), wireless and/or wireline access points (e.g., base stations, relays, low power nodes, femto-cells, etc.), user devices (e.g., user equipments (UEs), etc.), and controllers (e.g., schedulers, child SDN controllers, etc.). Network status information can include any data relevant to the network, such as data related to network congestion (e.g., buffer status, etc.), throughput, loading, quality measurements (e.g., channel quality information (CQI), etc.). Once collected, the network status information is consolidated into regional information, and reported to next-tier parent controllers until all regional information (consolidated or otherwise) is received at the root SDN controller 210. More specifically, the SDN controllers 212$a$, 212$b$ report regional information associated with the zone 2$a$ and zone 2$b$ (respectively) to the SDN controller 212, The SDN controller 212 consolidates the received regional information, along with the network status information collected from network elements located within region-2 but outside zones 2$a$ and 2$b$, into regional information corresponding to the region-2. The SDN controller 212 then reports the consolidated information to the root SDN controller 210. Similarly, the SDN controllers 211, 213-215 collect network status information from network elements in their respective regions/zones, consolidate the collected network status information into regional information, and report the regional information to the root SDN controller 210. As used herein, regional information refers to consolidated network status information pertaining to a given region, and may be loosely referred to as zoning information and/or domain information in various portions of this disclosure.

The root SDN controller 210 uses the reported regional information to compute cost-based parameters for the region-0, which are distributed to the SDN controllers 211, 212, 213, 214, and 215 for local provisioning. In some embodiments, different sets of cost-based parameters are distributed to different ones of the SDN controllers 211, 212, 213, 214, and 215. Notably, the SDN controller 212 may use the cost-based parameters received from the root-controller 210 to compute new cost-based parameters for the zones 2$a$ and 2$b$, which may be distributed to the SDN controllers 212$a$, 212$b$. Each of the SDN controllers 211-215 may then use the cost-based parameters received from the root root-controller 210 to perform local provisioning within their respective domains. In some embodiments, the SDN controllers 211-215 enter the cost-based parameters into region specific traffic optimization algorithms, which are solved locally to achieve provisioning in their corresponding regions. In this manner, the cost-based parameters may constrain local/distributed network resource provisioning in a manner that advances global traffic engineering objectives, e.g., fairness, throughput, etc.

Figure 4:
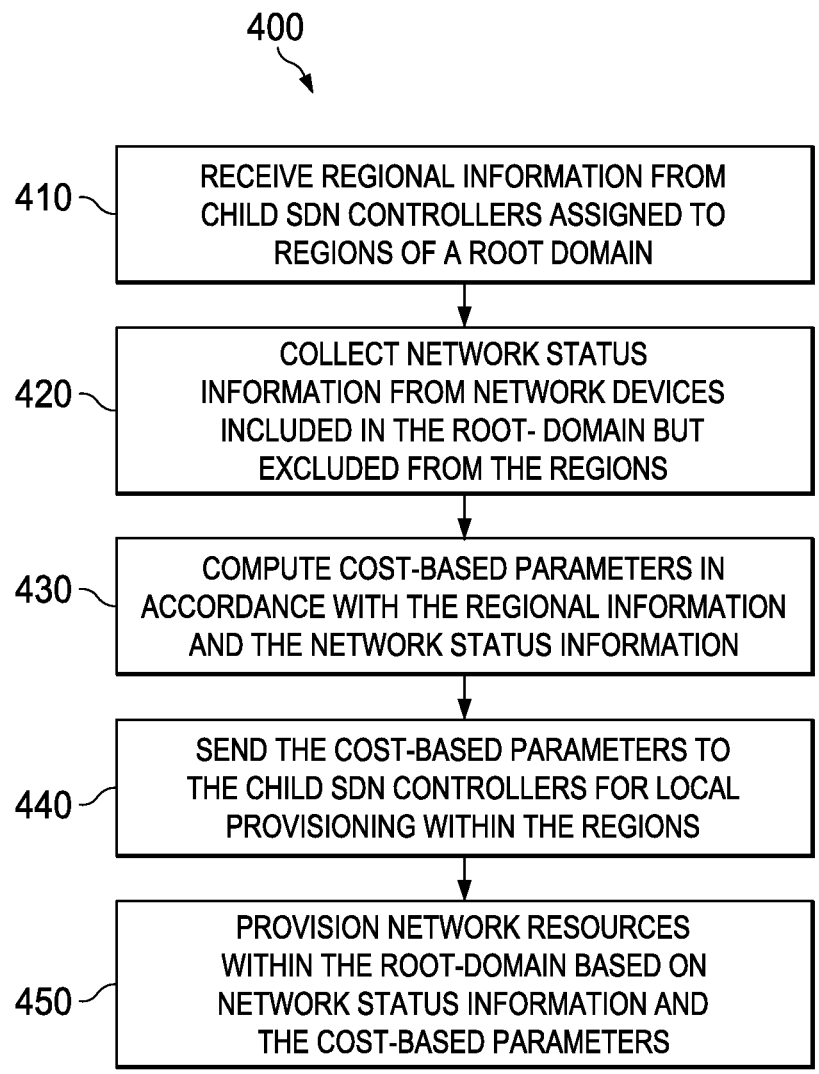
FIG. 4 illustrates a flowchart of an embodiment method for performing traffic engineering in a hierarchical SDN environment.

Aspects of this disclosure provide traffic engineering techniques for provisioning resources in hierarchical SDN environments. FIG. 4 illustrates an embodiment method 400 for performing traffic engineering in a hierarchical SDN environment, as might be performed by a root SDN controller assigned to a root-domain. As shown, the method 400 begins with step 410, where the root SDN controller receives regional information from child SDN controllers assigned to regions of the root-domain. Next, the method 400 proceeds to step 420, where the root SDN controller collects network status information from network devices included in the root-domain but excluded from the regions. Subsequently, the method 400 proceeds to step 430, where the root SDN controller computes cost-based parameters in accordance with the regional information and the network status information. Thereafter, the method 400 proceeds to step 440, where the root SDN controller sends the cost-based parameters to the child SDN controllers for local provisioning within the regions. Next, the method 400 proceeds to step 450, where the root SDN controller provisions network resources to network devices in accordance with the network information and the cost-based parameters. In some embodiments, resource provisioning in the root-domain may be achieved by solving a root-domain specific traffic engineering optimization algorithm.

Figure 5:
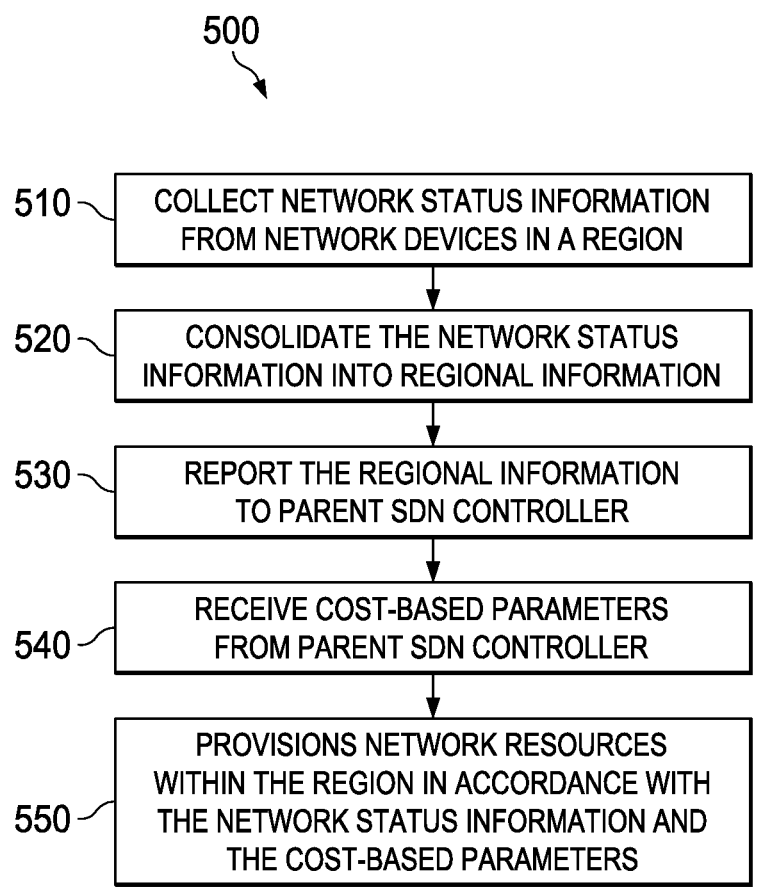
FIG. 5 illustrates a flowchart of another embodiment method for performing traffic engineering in a hierarchical SDN environment.

FIG. 5 illustrates an embodiment method 500 for performing traffic engineering in an SDN environment, as might be performed by a child SDN controller assigned to a region. As shown, the method 500 begins with step 510, where the child SDN controller collects network status information from network devices in the region. Subsequently, the method 500 proceeds to step 520, where the child SDN controller consolidates the network status information into regional information. Next, the method 500 proceeds to step 530, where the child SDN controller reports the regional information to a parent SDN controller. Thereafter, the method 500 proceeds to step 540, where the child SDN controller receives cost-based parameters from the parent SDN controller. Subsequently, the method 500 proceeds to step 550, where the child SDN controller provisions resources within the region in accordance with the network status information in the cost-based parameters. Regional resource provisioning may be achieved by solving a regional specific traffic engineering optimization problem based on the network information and the cost-based parameters.

Figure 6:
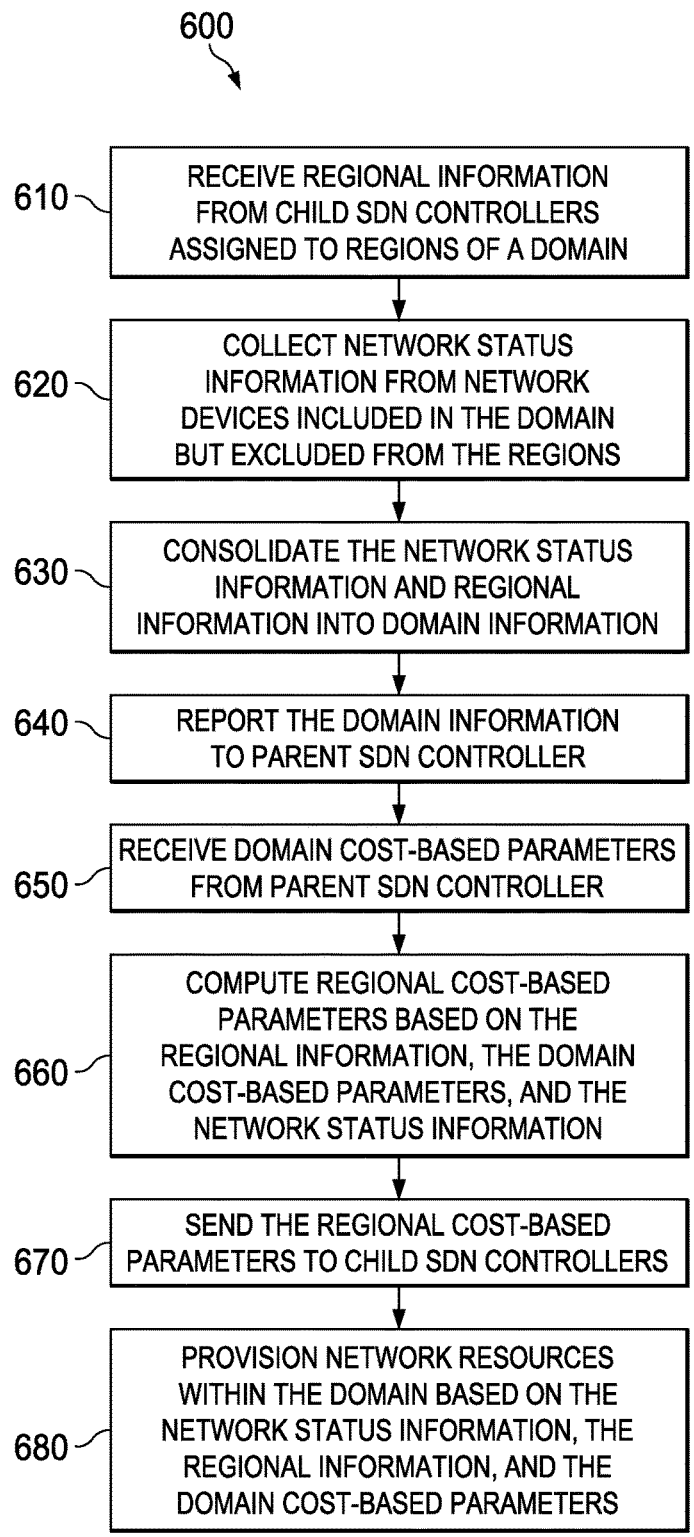
FIG. 6 illustrates a flowchart of yet another embodiment method for performing traffic engineering in a hierarchical SDN environment.

In some embodiments, an SDN controller may be assigned to an intermediary region/domain between a higher-tier region (e.g., root-domain) and one or more lower-tier regions (e.g., zones). FIG. 6 illustrates an embodiment method 600 for performing traffic engineering in an SDN environment, as might be performed by an SDN controller assigned to a domain. As shown, the method 600 begins with step 610, where the SDN controller receives regional information from child SDN controllers assigned to regions of the domain. Next, the method 600 proceeds to step 620, where the SDN controller collects network status information from network devices included in the domain but excluded from the regions. Subsequently, the method 600 proceeds to step 630, where the SDN controller consolidates the network status information and the regional information into domain information.

Figure 7:
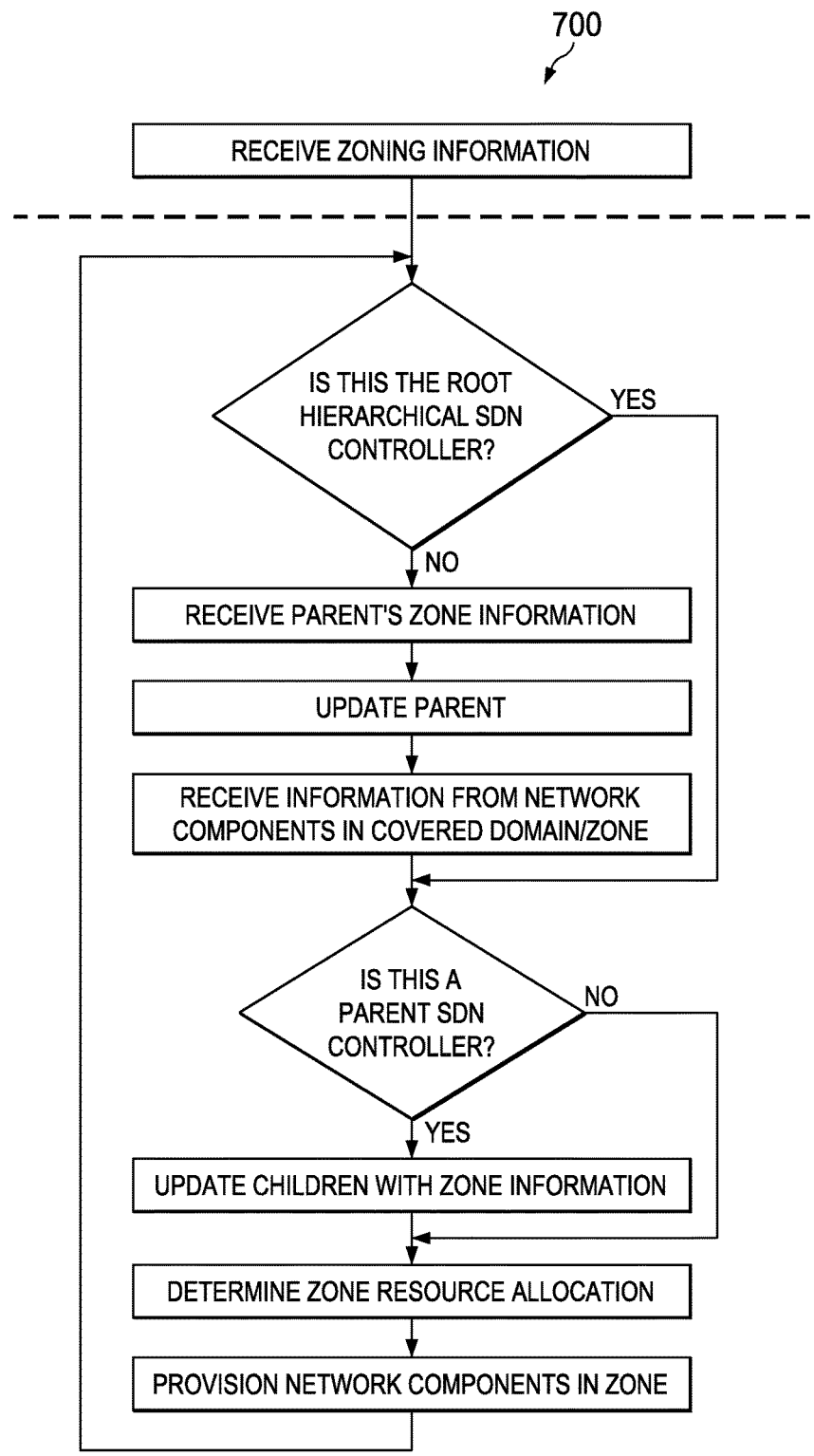
FIG. 7 illustrates a flowchart of yet another embodiment method for performing traffic engineering in a hierarchical SDN environment.

Next, the method 600 proceeds to step 640, where the SDN controller reports the domain information to a parent SDN controller. Thereafter, the method 600 proceeds to step 650, where the SDN controller receives domain cost-based parameters from the parent SDN controller. Subsequently, the method 600 proceeds to step 660, where the SDN controller computes regional cost-based parameters based on the regional information, the domain cost-based parameters, and the network status information. Next, the method 600 proceeds to step 670, where the SDN controller sends the regional cost-based parameters to the child SDN controllers. Thereafter, the method 600 proceeds to step 680, where the SDN controller provisions network resources to the network devices in accordance with the network status information, the regional information, and the domain cost-based parameters. This resource provisioning may include solving a domain specific traffic engineering optimization problem based on the network status information, the regional information, and the domain cost-based parameters. FIG. 7. Illustrates a generic method 700 for operating an SDN controller, which may be applied to child, parent, and root SDN controllers alike.

In the future, wireless networks may be required to provide large amounts of bandwidth to many users and types of traffic applications. Since the capacity of the network is limited by the finite wireless resources, dividing the resources in an efficient and equitable manner is important so that quality-of-service (QoS) requirements are met while maintaining high network resource utilization. Traffic engineering in wireless network is challenging because there are many possible links between UEs and the network. Moreover, centralized management schemes may suffer from scaling issues.

In a centralized SDN architecture, a single SDN controller makes decisions about the allocation of network resources. The controller collects network measurements from network components, such as buffer status at routers or channel quality indicator (CQI) measurements from user equipment (UE), and uses them to determine the best global network resource allocation. After the controller determines the global network resource allocation, it sends commands to network components, which provisions to provide the implementation of the resource allocation. Typically, the provisioning involves setting up the forwarding information base (FIB) on the routers so that they forward the traffic in a way that achieves allocated rates for end-to-end connections. It may also include setting up the priorities of traffic flows at routers and base-stations. It may also include setting up priorities for UEs on the uplink. The controller uses a traffic engineering optimization to determine the allocation of resources. Traffic engineering optimization may be based on linear programming or convex programming solution techniques. The objective of the optimization is to achieve some type of fairness among the end-to-end connections traversing the network (e.g. max-min fairness or lexicographical ordering), while ensuring that the allocated traffic does not exceed the rates on each of the links in the network. Since the optimization allocates the maximum end-to-end traffic for the given objective, it also maximizes the utilization of the links in the network.

There are four major problems with the centralized controller design. First, the centralized controller needs to perform a very large scale optimization on the network. The number of optimization variables is a linear function of the number of end-to-end connections and a linear function of the number of links in the network (the number of links is proportional to the square of the number of nodes). Depending on the type of formulation, the number of constraints is either a function of the number of available paths in the network (which is approximately exponential to the number nodes in the network), or a linear function of the number of nodes in the network. As the size of the network grows, solving these problems goes from taking a very long time (minutes or hours) to overpowering the computer running the optimization. Second, the SDN controller needs to collect the information from all of the network components, resulting in the reverse flooding of the network. Third, the SDN controller needs to provision all of the network components resulting in a flooding of the commands throughout the network. Fourth, some components may be very far away from the controller, resulting in large latency of the exchanged of network status and the commands. This latency may cause instability of the SDN control loop when one is used. Notably, in a wireless network, it is likely that the UE network components will be furthest from the SDN controller, which may cause time-sensitive information communicated from these components to be delayed (or become stale).

Aspects of this disclosure reduce/mitigate these issues by partitioning the network into regions and zones and assigning to each region to an SDN controller (e.g., a dedicated controller). Regions are referred to herein as domains and zones, with zones being the smallest logical division/region in the network. The zones may be assigned based on geographical properties of the network, or to divide the network into logical networks. In the case of the geographical zones, the zoning may follow the natural hierarchy of the network. In the case of logical networks each region may correspond to a virtual network and may be scaled in accordance with the number of flows in a virtual network.

In some embodiment, zoning addresses the SDN controller problems outlined earlier. Each SDN controller is responsible for collection of network status information as well as for provisioning resource to network components in its region or zone. In some embodiments, this may reduce the amount of network status information and/or control instructions/commands exchanged throughout the network. Additionally, the processing load on each controller is reduced because the traffic engineering optimization problem is simplified (e.g., fewer components/links considered).

One challenge with partitioning the network into domains/zones and distributing the SDN controller functionality is to decompose the traffic engineering optimization into corresponding parts in a way that still finds the optimum traffic engineering solution. Techniques for decomposing the traffic engineering problem for distributed operation are disclosed herein.

The traffic engineering problem can be formulated in various ways. In some embodiments, the network flow optimization framework performs convex optimization on traffic flows. Embodiment convex network flow optimization techniques may find the best allocation of end-to-end rates on each arc in the network to reduce the complexity of the objective function. In embodiment traffic engineering techniques, the objective function may be a sum of the convex utility functions of the allocated flows on each link in the network.

Embodiment convex network flow formulation techniques address several issues prevalent in conventional linear programming formulation techniques. First, linear programming formulation allows for only one family of fairness objectives, namely the max-min fairness. In contrast, embodiment convex optimization techniques allow for an unlimited number of fairness objectives, which can be expressed as a convex function of the allocated end-to-end rates. Convex optimization also allows for the introduction of objectives other than fairness, such as energy consumption. Second, linear formulation is not amenable to distributed computation. Due to the structure of the constraint matrix, it is not easy to decompose the problems into smaller problems. It may not be possible to solve the linear formulation of the traffic engineering problem in a distributed way before this formulation is converted into an equivalent convex optimization. In contrast, embodiment convex network flow formulation techniques retain information about the network topology, which can be used to solve decomposition/computation problems along natural boundaries in the network.

Different techniques may be used to formulate traffic engineering optimization problems depending on how constraints are formulated. One embodiment uses the arc-based conservation of flows in the constraints of the problem, while another embodiment uses path-based conservation of flows in the constraints of the problem. Both have benefits and drawbacks. Generally speaking, the arc-based conservation constraints result in solutions which are closer to optimal rate allocations. However, the arc-based constraints may be more computationally complex since they introduce more variables and constraints to the optimization and may include a step after the solution is produced to generate routing entries for source-based routing. On the other hand, path-based solutions tend to include a pre-optimization step to find the best set of paths to use in the optimization. Depending on path selection the solution with the arc-based optimization may result in sub-optimal solutions.

One technique models network topology as a set of N nodes, $n_1, \ldots, n_N \in \mathcal{N}_T$, connected with A directional arcs, $a_1, \ldots, a_A \in \mathcal{A}_T$. Arcs correspond to MAC or physical layer links in the network. Bi-directional links can be modeled as opposing pairs of arcs, connecting a pair of nodes together. This disclosure uses the terms link and arc interchangeably. Network traffic is modeled with arc flows (a function mapping arcs to real numbers), which are the allocation of rates on each link. End-to-end flows are associated with commodities, which correspond to end-to-end network connections between sources and destinations. There are K commodities in the network, $c_1, \ldots, c_K \in \mathcal{K}$. Each commodity $c_K$ has a corresponding pair of source and destination nodes $(s_k, d_k)$, where $s_k, d_k \in \mathcal{N}_T$. A commodity may be allowed to use only a subset of links in the network. The links for which the commodity is allowed to use are denoted as $\mathcal{A}_T(k) \subseteq \mathcal{A}_T$.

Figure 8:
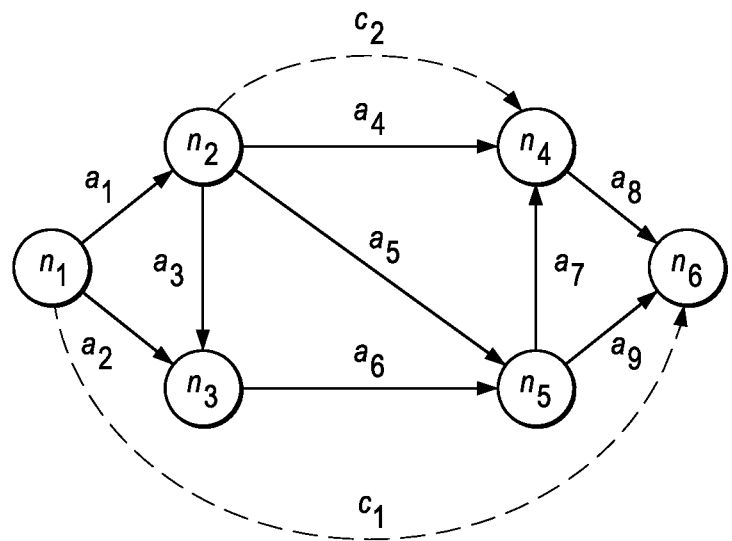
FIG. 8 illustrates a diagram of an embodiment hierarchical SDN configuration.

FIG. 8 illustrates an embodiment network (e.g., $\mathcal{G}_T(\mathcal{N}_T, \mathcal{A}_T)$) having six nodes $\mathcal{N}_T = \{n_1, \ldots, n_6\}$ interconnected by nine arcs $\mathcal{A}_T = \{a_1, \ldots, a_9\}$. The network has two commodities: one flowing from $s_1 = n_1$ to $d_1 = n_6$ and the other flowing from $s_2 = n_2$ to $d_2 = n_4$, shown with dashed lines. Network capacity is related to restriction on the amount traffic that can be carried on a link. Capacity can be modeled based on the restriction on the amount of traffic that can be allocated to all flows sharing the link. Each arc $a_j$ in the topology has an associated capacity $C_j$, which is the maximum amount of traffic that can be carried on the corresponding link. The total traffic traversing link $a_j$ from all commodities is denoted with $y_j$, which is a random process depending on to total amount of traffic traversing the link. In order to not exceed the network capacity, it is sufficient that $E[y_j] \leq C_j$. If links share a common resource, such as wireless bandwidth, then they may have dependency between their capacities. One way to model the shared capacity is to have restrictions for groups of links. Suppose that the links with shared constraints are grouped into possibly overlapping sets $\mathcal{W}_g \subseteq \mathcal{A}_T$, $g=1, \ldots, G$, then the constraint on the total rate traversing the links should belong in some convex set can be expressed as follows: $\{C_j | a_j \in \mathcal{W}_g\} \in \mathcal{C}_g$.

Each end-to-end connection (commodity) has an associated resource allocation (e.g., denoted herein as $x_k$), which may be any allocation type, e.g., bits-per-second, total number of resources, time-share or percentage allocation, etc. Since the source actually sends packets, $x_k$ is a random process that depends on length and inter-arrival distribution packet distributions. The optimization allocated average rate to the end-to-end connection, so it uses the average of $x_k$, $E[x_k]$. In the sequel, it can be assumed that $x_k$ is the time average of the random process. Each packet also has an associated end-to-end delay $d_k$, which is the time required for its packets to traverse the network and be successfully received at the destination. Notably, the delay experienced by each packet may be different from the delay experienced by other packets, due to the stochastic nature of other network traffic, or impairments in the transmission technology. So, $d_k$ is a random process, which has a time dependent distribution $F_{D_k}(x_k, t)$.

Aspects of this invention provide techniques for traffic engineering optimization. Traffic engineering optimization can be decomposed into a hierarchical traffic engineering optimization. One objective of the traffic engineering optimization may be to allocate end-to-end rates in a way that achieves a certain operator goal. Portions of this disclosure may assume that the operator wishes to obtain "fair" traffic allocations that achieve a certain utilization efficiency of network resources. Other optimization objectives can be used as well.

Convex optimization can be used to allocate resources in a "fair" way. For example, $\alpha$-fairness may be selected as the fairness type, and the end-to-end rates satisfying $\alpha$-fairness minimize the sum of the following utility functions for each commodity in accordance with:

$$U_k(x_k) = \begin{cases} \frac{x_k^{1-\alpha}}{\alpha - 1}, & \alpha \neq 1 \\ -\log(x_k), & \alpha = 1 \end{cases} \quad (1)$$

The utility function in this framework can easily be modified to achieve other types of fairness. For example, terms can be added to include the energy consumption of the allocation, or cost of traversing other operators' networks.

Convex network flow optimization can be used on optimization graphs that accurately model the networks, its connections and the optimization objective. The optimization graph is obtained by augmenting the topology graph of the network $\mathcal{G}_T(\mathcal{N}_T, \mathcal{A}_T)$. This modification is mathematically equivalent to the original graph and is used only for mathematical convenience. The optimization problem shown below can be easily formulated without this augmentation, or using other modifications of the topology graph. All of the nodes $\mathcal{N}_T$ from the topology graph are included in the new graph. All of the links $\mathcal{A}_T$ are also included in the augmented graph. In addition, for each commodity $c_K \in \mathcal{K}$, an arc is created from the destination $d_k \in \mathcal{N}_T$ to the source $s_k \in \mathcal{N}_T$, and these links are denoted with the set $a_1, \ldots, a_K \in \mathcal{A}_{COM}$. The new graph is denoted with $\mathcal{G}_{OPT}(\mathcal{N}_T, \mathcal{A}_{OPT})$, where $\mathcal{A}_{OPT} = \mathcal{A}_T \cup \mathcal{A}_{COM}$. Without any loss of generality, this convention can be used when the arcs corresponding to the commodities have indices corresponding to the commodities, which requires re-labeling of the arcs in the set $\mathcal{A}_T$.

Figure 9:
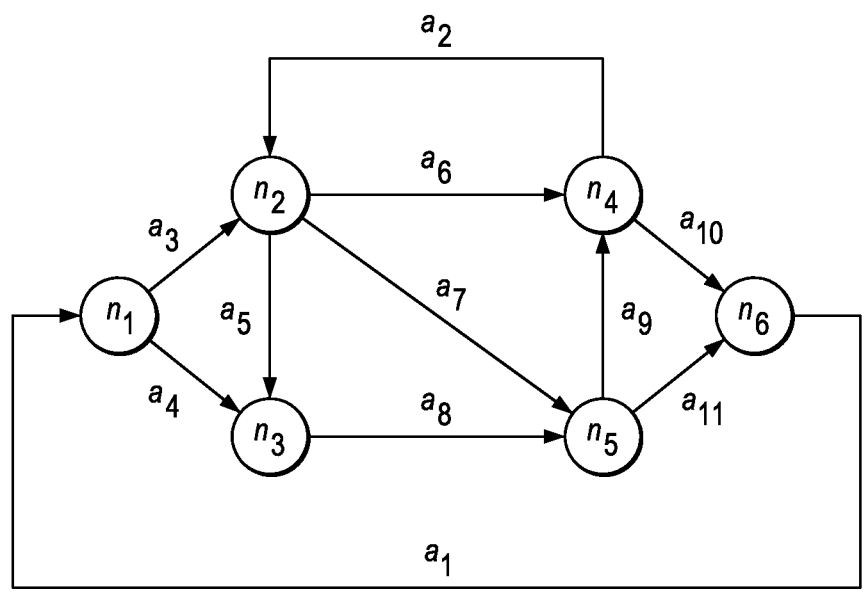
FIG. 9 illustrates a diagram of another embodiment hierarchical SDN configuration.

FIG. 9 illustrates an augmented graph of the example topology depicted in FIG. 8 with two commodities: $c_1$ flowing from $s_1 = n_1$ to $d_1 = n_6$ and $c_2$ flowing from $s_2 = n_2$ to $d_2 = n_4$. Two new arcs are added corresponding to the flows. The two arcs from the destination to the sources are labeled to correspond to their flow index, where $a_1$ corresponds to flow $(n_1, n_6)$ and $a_2$ corresponds to $(n_2, n_6)$. Given the definition of the augmented graph and the utility functions, the traffic engineering optimization is formulated as follows:

$$\min \sum_{c_k \in \mathcal{K}} U_k(x_j(k)); \quad (2a)$$

$$\{x_j(k), \ldots, x_j(k)\} \subseteq C_{OPT}, a_j \in \mathcal{A}_{OPT}, c_k \in \mathcal{K}; \quad (2b)$$

$$\sum_{c_k \in \mathcal{K}} x_j(k) \leq C_j, a_j \in \mathcal{A}_{OPT}; \quad (2c)$$

$$\{C_j \mid a_j \in \mathcal{W}_g\} \in C_g, g = 1, \ldots, G,; \quad (2d)$$

$$x_j(k) \geq 0 a_j \in \mathcal{A}_{OPT}, c_k \in \mathcal{K}.. \quad (2e)$$

The optimization finds the set of link allocations $x_j(k)$ for each link $a_j$ and commodity $c_k$ on the augmented graph $\mathcal{G}_{OPT}(\mathcal{N}_T, \mathcal{A}_F)$. The objective function (2a) maximizes the sum of utilities on links $a_j$ for $j = 1, \ldots, K$. Due to the construction of the augmented graph, each of the links $a_j$ for $j = 1, \ldots, K$ only contains the traffic of one corresponding commodity $c_j$, so this objective function corresponds to the fairness objective (1). The constraint (2b) ensures that the allocated flows conform to the conservation of flows. This constraint is where the arc-based and path-based constraints differ from each other, which are explained in Section 2.2.1 and Section 2.2.2, respectively. Constraints (2c) and (2d) ensure that the allocated traffic does not exceed the capacity of the links. Constraint (2c) is the simple capacity constraint for each link, while constraint (2d) is the capacity constraint for links sharing a scheduling domain. Finally, constraint (2e) ensures that the allocation of rates is positive.

Aspects of this disclosure provide traffic engineering optimization techniques that use arc-based constraints. In one embodiment, the optimization problem is formulated as follows:

$$\min \sum_{c_k \in \mathcal{K}} U_k(x_k(k)); \quad (3a)$$

$$\sum_{a_j \in \mathcal{N}_i^+ \cap \mathcal{A}_T(k)} x_j(k) - \sum_{a_j \in \mathcal{N}_i^- \cap \mathcal{A}_T(k)} x_j(k) = 0, n_i \in \mathcal{N}_T, c_k \in \mathcal{K}; \quad (3b)$$

$$\sum_{\{k \mid a_j \in \mathcal{A}_T(k)\}} x_j(k) \leq C_j, a_j \in \mathcal{A}_{OPT}; \quad (3c)$$

$$\{C_j \mid a_j \in \mathcal{W}_g\} \in C_g, g = 1, \ldots, G,; \quad (3d)$$

$$x_j(k) \geq 0 \cdot a_j \in \mathcal{A}_{OPT}, c_k \in \mathcal{K}. \quad (3e)$$

The optimization finds the set of link allocations $x_j(k)$ for each link $a_j$ and commodity $c_k$ on the augmented graph $\mathcal{G}_{OPT}(\mathcal{N}_T, \mathcal{A}_F)$. The objective function (3a) maximizes the sum of utilities on links $a_j$ for $j = 1, \ldots, K$. Due to the construction of the augmented graph, each of the links $a_j$ for $j = 1, \ldots, K$ only contains the traffic of one corresponding commodity $c_j$, so this objective function corresponds to the fairness objective (1). The constraint (3b) ensures the conservation of flows for each commodity at each node. Allocation of traffic for a flow on incoming links is the same as the allocation of traffic for outgoing links. The intersections $\mathcal{N}_i^+ \cap \mathcal{A}_T(k)$ and $\mathcal{N}_i^- \cap \mathcal{A}_T(k)$ ensure that only the links, which the commodity $k$ can use are considered for the conservation of flows. Constraints (3c) and (3d) ensure that the total traffic of all flows on links does not exceed the capacity of the links. Constraint (3c) is the simple capacity constraint for the link, while constraint (3d) is the capacity constraint for links sharing a scheduling domain. Finally, constraint (3e) ensures that the allocation of rates is non-negative.

Aspects of this disclosure provide traffic engineering optimization techniques that use path based constraints. Arc-based formulation may be better suited for some networks in the sense that it finds the best allocation of links for each commodity in the network. One problem with that formulation is that it does not limit the number of paths used in the final solution. One way to limit the number of paths in the network is to find paths first and then use them for traffic allocation. In the sequel, it may be assumed that a set of paths are available for each commodity k, which is denoted with $\mathcal{P}_k$. A path may be a set of arcs, so $p \subseteq \mathcal{A}_T$ since the reverse links in the augmented graphs are only used for mathematical purposes they never become part of a path. The notation $p_r \in \mathcal{P}_k$ may refer to the r-th path in $\mathcal{P}_k$. In the context of traffic engineering optimization using path-based constraints, the optimization problem may be formulated as follows:

$$\min \sum_{c_k \in \mathcal{K}} U_k(x_k(k)); \quad (4a)$$

$$x_k^{(k)} - \sum_{p_r \in \mathcal{P}_k} h_r(k) = 0, a_k \in \mathcal{A}_{COM}, c_k \in \mathcal{K}; \quad (4b)$$

$$x_j(k) - \sum_{\{p_r \in \mathcal{P}_k | a_j \in \mathcal{P}_k\}} h_r(k) = 0, a_j \in \mathcal{A}_T, c_k \in \mathcal{K}; \quad (4c)$$

$$\sum_{\{k | a_j \in \mathcal{A}_T(k)\}} x_j(k) \leq C_j, a_j \in \mathcal{A}_{OPT}; \quad (4d)$$

$$\{C_j \mid a_j \in \mathcal{W}_g\} \in C_g, g = 1, \ldots, G,; \quad (4e)$$

$$x_j(k) \geq 0, h_p(k) \geq 0, a_j \in \mathcal{A}_{OPT}, c_k \in \mathcal{K}, p \in \mathcal{P}_k. \quad (4f)$$

The optimization finds the set of path allocations $h_r(k)$ for each path $p_r \in \mathcal{P}_k$, where $\mathcal{P}_k$ is the set of paths selected for commodity $c_k$. An auxiliary set of variables $x_j(k)$ are user, which are the actual allocations on links, given the allocation on each path. The link allocation variables are actually unnecessary for this optimization and may be used entirely for the purposes of readability and to relate to other portions of this disclosure. With the auxiliary variables, the objective function (4a) is the same as the objective function (3). The conservation of flows constraints from the arc-based optimization are now represented with constraints (4b) and (4c). Constraint (4b) defines auxiliary variables $x_j(k)$, which correspond to the links associated with flows in the augmented topology, $a_1, \ldots, a_K \in \mathcal{A}_{OPT}$. The rate on those links is the sum of rates to allocate to all of the paths associated with the commodity. These arcs are a special case because they are not any paths in the real network topology. Constraint (4c) defines auxiliary variables $x_j(k)$ which correspond to the links in the original topology graph of the network, $a_{K+1}, \ldots, a_{K+A} \in \mathcal{A}_{OPT}$. The rate allocated on each link is the sum of rates allocated on the paths using the link, which are specified in the summation. Constraints (4d) and (4e) are the capacity constraints for the network, similar to constraints (3c) and (3d) in the arc-based formulation. Finally, constraint (4f) ensures that the allocation of rates is non-negative.

Notably, if the set of paths associated with each commodity includes all possible paths between the source and the destination of the commodity, the solution of (3) and (4) would have the same optimum value. However, in practical implementations, the set of paths may be only a sub-set of all of the paths, so the path-based formulation will be sub-optimal compared to the arc-based formulation.

Aspects of this disclosure provide techniques for formulating joint link constraints may be to model the constraint of the wired capacity or shared wireless spectrum. Wired constraints on link capacity are modeled with a simple upper bound. For wired links, the domain $\mathcal{W}_g$ is a single incoming or an outgoing link of a node. The upper bound on a wired link is denoted as follows: $a_j \in \mathcal{A}_T$ with $C_j \leq C_r^{max}$. A similar bound can be put on the augmenting arcs to ensure that the capacity of a flow does not exceed some maximum allowable value, so for all $a_j \in \mathcal{A}_{COM}$, $C_j \leq C_j^{max}$.

Wireless constraint on the link capacity can be modeled with scheduling domains. One type of scheduling domain is a resource restriction constraint at the transmitter. In a wireless network there are a limited number of "resources". Resources are the way the bandwidth is assigned in time, frequency or space. For example, in the LTE system the wireless resources are assigned in terms of resource blocks (RBs) and there are only $N_{RB}$ available resource blocks, which depends on the bandwidth of the system. For this system, the sets of links sharing the domain $\mathcal{W}_g$ are the outgoing or incoming links of a wireless node. For example, in the downlink transmission using frequency division duplex (FDD) mode, bandwidth is shared by assigning RBs user-equipment (UE). Downlink transmissions of each UE connected to the base-station can be modeled with an arc leaving a wireless node $n_i$. It is possible to denote the number of bits that can be transmitted by link j on RB l with $\gamma_{jl}$, and use $r_{jl}$ to indicate that RB l is allocated to link j (corresponding to one of the UEs), then the capacity of the links given that they originate on wireless node $n_i$ is given by:

$$0 \leq C_j \leq \frac{1}{T_S} \sum_{l=1}^{N_{RB}} \gamma_{jl} r_{jl}, a_j \in \mathcal{N}_i^- \text{ and} \quad (5)$$

$$\sum_{a_j \in \mathcal{N}_i^-} r_{jl} = 1, l = 1, \ldots, N_{RB},$$

where $T_S$ is the duration of the RB in seconds. The last summation ensures that only one UE (corresponding arc is assigned in each RB). The restriction on wireless link capacity (5) can be easily expanded to include uplink transmission by assigning an incoming arc of a node to UEs uplink transmissions (the equation can be modified by replacing $\mathcal{N}_i^-$ with $\mathcal{N}_i^+$). The equation can also be expanded to model a time division duplexing (TDD) by replacing $\mathcal{N}_i^-$ with $\mathcal{N}_i^- \cup \mathcal{N}_i^+$.

Another way to model wireless scheduling domains is to model the long-term share of the UEs at a base-station. For example, for round-robin scheduling it is known that UEs sharing a base-station will be assigned an equal number of resources in the long-term. With that assumption, the wireless constraint can be expressed as follows:

$$0 \leq C_j \leq \frac{1}{T_S} \frac{1}{\|\mathcal{N}_i^-\|} \sum_{l=1}^{N_{RB}} \frac{\gamma_{jl}}{N_{RB}}, \quad (6)$$

$$a_j \in \mathcal{N}_i^-.$$

In the equation $\|\mathcal{N}_i^-\|$ is the number of UEs connected to the base station and the summation calculates the average number of bits that can be transmitted to the UE in each RB. Similar formulas exist for other types of schedulers.

Embodiments of this disclosure distribute traffic engineering optimization by grouping the constraints into geographically related zones. Zones may be determined prior to the optimization process. One way to determine the zones is to group network components in the same sub-network together, but other more sophisticated approaches may also be possible. For example, in a radio access network one region may have all nodes connected with wired technology, while another region may contain nodes using wireless technology. In the wired region, the zones may be determined based on pre-existing sub-network design. In the wireless region the zones may be determined to keep scheduling domains together. One example of keeping scheduling domains together is to keep base-stations in the same C-RAN cluster together.

Aspects of this disclosure describe how zone partitioning changes the traffic engineering optimization, as well as how the partitioned network optimization can be solved in a distributed way. Additionally, aspects describe how path constraints spanning multiple zones can be handled in the distributed framework. A network can be divided into Z zones, $\mathcal{Z}_1, \ldots, \mathcal{Z}_Z \in \mathcal{Z}$. Each zone contains a subset of the nodes in the topology $\mathcal{Z}_j \subseteq \mathcal{N}_T$ and each node is in only one zone $$\bigcup_{l=1}^{Z} \mathcal{Z}_l = \mathcal{N}_T \text{ and } \bigcap_{l=1}^{Z} \mathcal{Z}_l = \emptyset.$$

Arcs are not classified into zones. It is possible to distinguish between the arcs which are in the border of a zone and arcs which are inner to a zone.

The inner arcs of a zone are the arcs which have their source and destination in the zone, and may be defined as follows:

$$\mathcal{J}_l = \left\{ a_k \in \left( \bigcup_{n_i \in \mathcal{Z}_l} n_i^+ \right) \cap \left( \bigcup_{n_i \in \mathcal{Z}_l} n_i^- \right) \right\}. \quad (7)$$

Border arcs are the arcs which originate in a zone and terminate in another zone (i.e. their source node is one zone, while their destination is in a different zone). Border arcs can be denoted with $\mathcal{Z}_l^-$ arcs leaving zone $\mathcal{Z}_l$ and with $\mathcal{Z}_l^+$ the arcs entering a zone $\mathcal{Z}_l$. Mathematically, arcs leaving a zone can be defined as the arcs that are in the outgoing arc set of some node in the zone, but not in the incoming arc set of any node in the zone, as follows:

$$\mathcal{Z}_l^- = \left\{ a_k \in \mathcal{A}_{OPT} \middle| a_k \in \bigcup_{n_i \in \mathcal{Z}_l} n_i^-, a_k \notin \bigcup_{n_i \in \mathcal{Z}_l} n_i^+ \right\}.$$

Similarly, incoming arcs of a zone can be defined as the arcs that are in the incoming arc set of some node in the zone, but not in the outgoing arc set of any node in the zone, as follows:

$$\mathcal{Z}_l^+ = \left\{ a_k \in \mathcal{A}_{OPT} \middle| a_k \in \bigcup_{n_i \in \mathcal{Z}_l} n_i^+, a_k \notin \bigcup_{n_i \in \mathcal{Z}_l} n_i^- \right\}.$$

A border of zone are the arcs entering and exiting the zone $\mathcal{B}_l = \mathcal{Z}_l^- \cap \mathcal{Z}_l^+$. With the above definitions, a set of arcs can be divided into multiple non-overlapping sets of inner arcs and border arcs as follows:

$$\mathcal{A}_{OPT} = \left( \bigcup_{l=1}^{Z} \mathcal{J}_l \right) \cup \left( \bigcup_{l=1}^{Z} \mathcal{B}_l \right).$$

Figure 10:
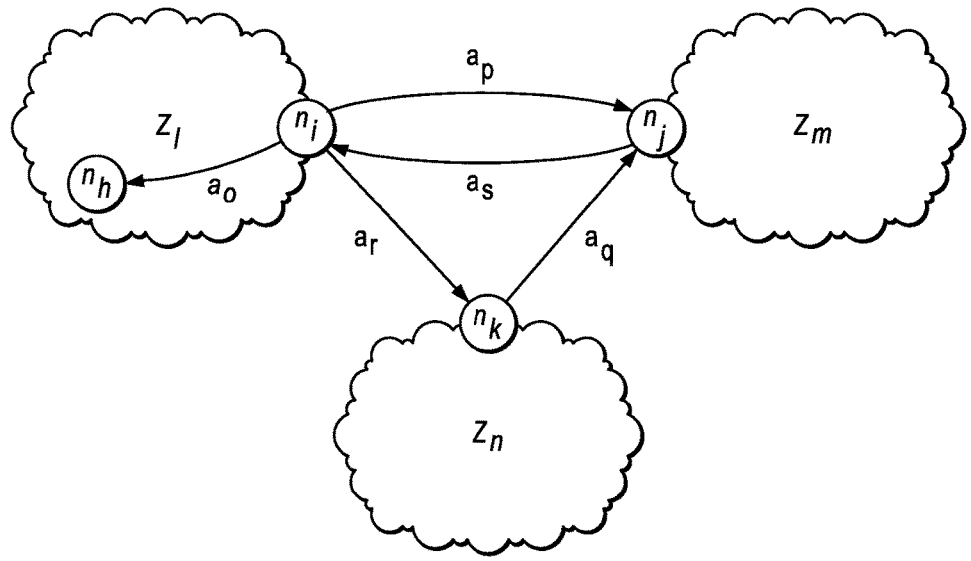
FIG. 10 illustrates a diagram of yet another embodiment hierarchical SDN configuration.

FIG. 10 illustrates a system where zoning is based on sub-networks. There are three zones $\mathcal{Z}_l$, $\mathcal{Z}_m$ and $\mathcal{Z}_n$. The outgoing arcs of zone $\mathcal{Z}_l$ are $\mathcal{Z}_l^- = \{a_r, a_p\}$, while the incoming arcs are $\mathcal{Z}_l^+ = \{a_s\}$. The border of $\mathcal{Z}_l$ is defined by $\mathcal{B}_l = \{a_p, a_s, a_r\}$. In order to explain how the traffic engineering optimization is distributed, a new graph may be created from the augmented topology graph $\mathcal{G}_{OPT}(\mathcal{N}_T, \mathcal{A}_F)$. The new graph has an extra vertex for each border arc. A border arc $a_m$ is replaced with a border node $n_m$ and two new arcs $a_m^-$ and $a_m^+$ connecting the source node of $a_m$ to node $n_m$ and node $n_m$ to destination node of $a_m$, respectively. The − sign on the arc indicates that it is leaving a zone, while the + sign indicates that it is entering a zone. The set of border nodes are denoted with $\mathcal{N}_B$. The change results in a new graph $\mathcal{G}_{PART}(\mathcal{N}_{PART}, \mathcal{A}_{PART})$, where $$\mathcal{N}_{PART} = \mathcal{N}_T \cup \mathcal{N}_B \text{ and } \mathcal{A}_{PART} = \left( \bigcup_{l=1}^{Z} \mathcal{J}_l \right) \cup \left( \bigcup_{m=1}^{\|\mathcal{N}_B\|} \{a_m^-, a_m^+\} \right).$$

Figure 11:
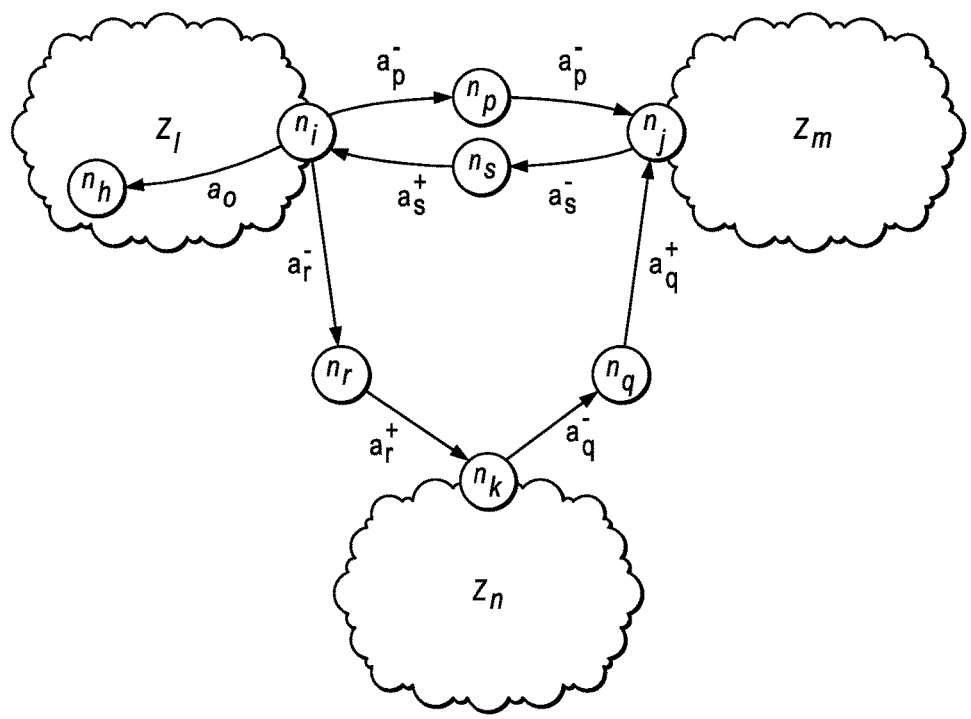
FIG. 11 illustrates a diagram of yet another embodiment hierarchical SDN configuration.

FIG. 11 illustrates an optimization graph resulting from modifications to FIG. 10. The set of arcs $\mathcal{A}_{PART}$ in the new set is logically divided into subsets associated with each zone. Each zone has inner arcs and outer arcs. The inner arcs of a zone were defined earlier in (7), which is still valid due to the fact that all of the inner arcs are still in the partitioned graph. The outer arcs of a zone can be defined as the arcs going into the border vertices in $\mathcal{N}_B$ or arcs coming into the zone from the border vertices. The outer arcs of a zone $Z_l$ are denoted with $\mathcal{O}_l$. If the source arc of $a_m$ was in zone $Z_l$, then $a_m^-$ is added to the outer arcs of the zone, $\mathcal{O}_l$. Similarly, if the destination of arc $a_m$ was in zone $Z_l$, then $a_m^+$ is added to $\mathcal{O}_l$. With that, the following notation is derived:

$$\mathcal{A}_{PART} = \left( \bigcup_{l=1}^{Z} \mathcal{J}_l \right) \cup \left( \bigcup_{l=1}^{Z} \mathcal{O}_l \right) = \bigcup_{l=1}^{Z} \mathcal{A}_l, \text{ where } \mathcal{A}_l = \mathcal{J}_l \cup \mathcal{O}_l$$

is the set of all inner and outer arcs belonging to zone $Z_l$. Since each outer arc corresponds to one of the border arcs, defined earlier, border arc and outer arc are used interchangeably in the sequel.

For mathematically convenience, it is possible to define the incoming and outgoing outer arcs, $\mathcal{O}_l^+$ and $\mathcal{O}_l^-$. If $a_m^- \in \mathcal{O}_l$ then $a_m^- \in \mathcal{O}_l^-$ and if $a_m^+ \in \mathcal{O}_l$ then $a_m^+ \in \mathcal{O}_l^+$. It is possible to drop the + and −, so that a border arc $a_m \in \mathcal{O}_l$ is associated with the border node $n_m \in \mathcal{N}_B$. It is possible to use the notation $a_l \in \mathcal{N}_m^-$, $n_m \in \mathcal{N}_B$ to refer to $a_m^+$ and $a_j \in \mathcal{N}_m^+$, $n_m \in \mathcal{N}_B$ to refer to and $a_m^-$. $\mathcal{J}_l(k)$ and $\mathcal{O}_l(k)$ are used to denote the inner and outer arcs of commodity k in inner zone $\mathcal{J}_l$ and outer zone $\mathcal{O}_l$, respectively and $\mathcal{A}_l(k) = \mathcal{J}_l(k) \cup \mathcal{N}_l(k)$ to denote all arcs associated with commodity k in zone $Z_l$. The reverse commodity arcs in set $\mathcal{A}_{COM}$ (e.g., as shown in FIG. 9) need special treatment due to their association with utility functions. When the graph is partitioned it may happen that one of the reverse arcs is a border zone. Since two new arcs are introduced it becomes unclear which of them should have the association with utility function. One possibility is to put the objective function on each arc and scale the utility appropriately. The objective function can be expressed as follows $$U_m(x_m(k)) \to \frac{1}{2} U_m(x_m^+(k)) + \frac{1}{2} U_m(x_m^-(k))$$

for each arc split into two border zones. Notably, the optimization will have $x_m^-(k)=x_m^+(k)=x_m(k)$ at the optimum point, so that transformation will not change the value of the objective function. Another possibility is to use the convention that utility functions are assigned to the arcs, which belong to the zone where the commodity terminates. In this case, if a utility function is associated a reverse arc $a_m$ in the optimization graph then the utility function is associated with $a_m^+$ in the portioned graph, the following may be used: $U_m(x_m(k)) \to U_m(x_m^+(k))$.

Using the convention, it is possible to define the set of arcs in a zone, which have associated utility function. These are all reverse arcs which originate and terminate in the zone and the arcs of border nodes, which terminate in the zone. It is then possible to divide commodities into zones, based on which zone their commodity function belongs to, using: $\mathcal{K}_l = \{c_k \in \mathcal{K} | a_k \in \mathcal{J}_l \vee a_k \in \mathcal{O}_l^+\}$. Since the partitioned graph includes new arcs, the paths in the graph should also be updated. If an arc in the optimization graph was on the border two zones and was on a path, it may be assumed that the path is updated with the two new arcs, in the correct order, in its place. $\mathcal{P}_k$ is still used to refer to paths associated with commodity k, even in the new graph.

Aspects of this disclosure provide techniques for partitioning the traffic engineering problem with arc-based constraints. In the optimization graph, the arc-based traffic engineering optimization becomes:

$$\min \sum_{l=1}^{Z} \sum_{c_k \in \mathcal{K}_l} U_k(x_k(k)); \quad (8a)$$

$$\sum_{a_j \in N_i^+ \cap \mathcal{A}_l(k)} x_j(k) - \sum_{a_j \in N_i^- \cap \mathcal{A}_l(k)} x_j(k) = 0, \quad (8b)$$

$$n_i \in \mathcal{Z}_l, c_k \in \mathcal{K}, l = 1, \ldots, Z;$$

$$\sum_{\{k | a_j \in \mathcal{A}_l(k)\}} x_j(k) \le C_j, a_j \in \mathcal{A}_l, l = 1, \ldots, Z; \quad (8c)$$

$$\{C_j | a_j \in \mathcal{W}_g\} \in C_g, \mathcal{W}_g \subseteq \mathcal{A}_l, l = 1, \ldots, Z; \quad (8d)$$

$$x_j(k) \ge 0, a_j \in \mathcal{A}_l, c_k \in \mathcal{K}, l = 1, \ldots, Z; \quad (8e)$$

$$\sum_{a_i \in O_l^+(k)} x_i(k) - \sum_{a_j \in O_l^-(k)} x_j(k) = 0, c_k \in \mathcal{K}, l = 1, \ldots, Z; \quad (8f)$$

$$x_i(k) - x_j(k) = 0, c_k \in \mathcal{K}, a_i \in \mathcal{N}_m^- \cap \mathcal{A}_l(k), \quad (8g)$$
$$a_j \in \mathcal{N}_m^+ \cap \mathcal{A}_l(k), n_m \in \mathcal{N}_B..$$

The formulation performs the same optimization as the original arc-based traffic engineering optimization (3) with the difference that variables and constraints are grouped by zone and that there are new constraints associated with the border zones. The objective function (8a) is still a sum of utility function associated with commodities, however the commodities are now divided into zones. Constraint (8b) is the conservation of flows in each zone, and corresponds to the constraint (3b) in the original formulation. Constraints (8c) and (8d) model the wireless constraints in each zone, corresponding to constraints (3c) and (3d). Here the formulation assumes that the arcs sharing the available capacity are always in the same zone, however the distributed approach discussed herein can be easily extended to the case where arcs sharing capacity are in different zones. Constraint (8f) enforces the fact that traffic of each commodity entering a zone is equal to the traffic exiting the zone. This constraint is the consequence of the conservation of flows in constraint (8b) and should be added to keep the circulation format of the optimization problem in each zone. Finally, constraint (8g) is the conservation of flows at the border nodes.

The partitioning in the optimization can be seen in constraints (8b)-(8f). Only a subset of the conservation of flows constraints appears in each zone. Since each of the link variables is associated with a constraint, only a subset of variables is each zone. The only constraint that cannot be partitioned is (8h), since it involves arcs in multiple border zones. Subsequent descriptions demonstrate how these constraints can be partitioned using Lagrangian duality.

Aspects of this disclosure provide techniques for partitioning the traffic engineering problem with path-based constraints. Using the optimization graph, it is possible to formulate the traffic engineering optimization with the path-based constraints:

$$\min \sum_{l=1}^{Z} \sum_{c_k \in \mathcal{K}_l} U_k(x_k(k)); \quad (9a)$$

$$x_k(k) - \sum_{p_r \in \mathcal{P}_k} h_r(k) = 0, a_k \in \mathcal{A}_{COM} \cap \mathcal{A}_l, c_k \in \mathcal{K}, l = 1, \ldots, Z; \quad (9b)$$

$$x_j(k) - \sum_{\{p_r \in \mathcal{P}_k | a_j \in \mathcal{P}_k\}} h_r(k) = 0, a_j \in \mathcal{A}_T \cap \mathcal{A}_l(k), l = 1, \ldots, Z; \quad (9c)$$

$$\sum_{\{k | a_j \in \mathcal{A}_l(k)\}} x_j(k) \le C_j, a_j \in \mathcal{A}_l, l = 1, \ldots, Z; \quad (9d)$$

$$\{C_j | a_j \in \mathcal{W}_g\} \in C_g, \mathcal{W}_g \subseteq \mathcal{A}_l, l = 1, \ldots, Z; \quad (9e)$$

$$y_j \ge 0, x_j(k) \ge 0, h_p(k) \ge 0, a_j \in \mathcal{A}_l, c_k \in \mathcal{K}, l = 1, \ldots, Z; \quad (9f)$$

$$\sum_{a_i \in O_l^+(k)} x_i(k) - \sum_{a_j \in O_l^-(k)} x_j(k) = 0, c_k \in \mathcal{K}, l = 1, \ldots, Z; \quad (9g)$$

$$x_i(k) - x_j(k) = 0, c_k \in \mathcal{K}, n_m \in \mathcal{N}_B, \quad (9h)$$
$$a_i \in \mathcal{N}_m^- \cap \mathcal{A}_l(k), a_j \in \mathcal{N}_m^+ \cap \mathcal{A}_l(k).$$

The optimization finds the set of path allocations $h_r(k)$ for each path $p_r \in \mathcal{P}_k$, similar to optimization (4). The objective function (9a), maximizes the sum utility rate of each connection on all paths. Constraints (9b) and (9c) introduce auxiliary variables $x_j(k)$, which represent the total flow allocated to commodity k on link j. Constraint (9b) is the special case of the reverse links, while the constraint (9c) is the case of regular arcs. Constraints (9d) and (9e) couple together commodities on links and model the wireless constraints in the network. Constraint (9d) limits the total allocated rate on each arc, which is dependent on the capacity constraints, defined in constraint (9e). Constraint (9g) ensures the flow conservation of all flows entering and exiting a zone. Constraint (9h) is the conservation of flows on the border nodes.

Aspects of this disclosure provide techniques for achieving Distributed optimization through Lagrangian duality.

Embodiment methods solve the optimization problem as several independent parts, where each part only considers the variables and constraints in one of the zones. Regarding the dual problem. Lagrangian duality is used to distribute the arc-based and path-based optimizations. First, the Lagrange function and the dual function are defined. The Lagrange function combines the objective function of a problem and a subset of the constraints using Lagrange multipliers. To create the Lagrange function for the problem, coupling constraints (8g) or (9h) may be added to the objective function with the use of Lagrangian variables, $$\lambda_1(k), \ldots, \lambda_{\|N_B\|}(k),$$

$k=1, \ldots, K$, one for each constraint. Notably, there are $K\|\mathcal{N}_B\|$ of these constraints, one for every border node and every commodity. The Lagrange function for ontimization (8) or (9) is given as follows:

$$L(x, \lambda) = \sum_{l=1}^{Z} \sum_{c_k \in \mathcal{K}_l} U_k(x_k(k)) + \quad (10)$$

$$\sum_{c_k \in \mathcal{K}} \sum_{n_m \in N_B, a_i \in N_m^-, a_j \in N_m^+} \lambda_m(k)[x_i(k) - x_j(k)] =$$

$$\sum_{l=1}^{Z} \sum_{c_k \in \mathcal{K}_l} U_k(x_k(k)) +$$

$$\sum_{l=1}^{Z} \left( \begin{array}{c} \sum_{c_k \in \mathcal{K}} \sum_{a_m \in O_l^+} \lambda_m(k)x_m(k) - \\ \sum_{c_k \in \mathcal{K}} \sum_{a_m \in O_l^-} \lambda_m(k)x_m(k) \end{array} \right) =$$

$$\sum_{l=1}^{Z} \left( \begin{array}{c} \sum_{c_k \in \mathcal{K}_l} U_k(x_k(k)) + \\ \sum_{c_k \in \mathcal{K}} \sum_{a_m \in O_l^+(k)} \lambda_m(k)x_m(k) - \\ \sum_{c_k \in \mathcal{K}} \sum_{a_m \in O_l^-(k)} \lambda_m(k)x_m(k) \end{array} \right),$$

where λ is the set of Lagrangian multipliers, $$\lambda = [\lambda(1), \ldots, \lambda(K)], \text{ where } \lambda(k) = [\lambda_1(k), \ldots, \lambda_{\|N_B\|}(k)]$$

is the vector of Lagrangian variables for commodity k, x is the set of variables $x_j(k)$ $x=[x_l, \ldots, x_L]$, where $x_l$ to refer to the subset of variables $x_j(k)$, which only appear in the constraints relevant to the zone l and its border, and the notation $x_l \in \mathcal{X}_l$ is used to indicate that $x_l$ satisfies the constraints (8b)-(8g) or constraints (9b)-(9g), depending on which of the formulations are being solved. Variables are grouped according to which zone they belong to in the second summation. Each of the arcs connected to one of the border zones $n_m \in \mathcal{N}_B$, belongs to one of the outer zones $O_l^+$ or $O_l^-$, so that the last summation in (10) can be split between the zones. The dual function for the optimization is the minimization of the Lagrange function over x is expressed as follows:

$$q(\lambda) = \min_{x_l \in \mathcal{X}_l, l=1, \ldots, Z} L(x, \lambda). \quad (11)$$

The dual function may be used to formulate the Lagrangian dual problem. The dual problem finds the set of Lagrange multipliers, which maximize the dual function. The Lagrangian dual problem of the optimization (8) or (9) is:

$$\max_{\lambda \in \mathbb{R}^{K\|N_B\|}} q(\lambda). \quad (12)$$

The solution of the dual optimization gives the optimum set of multipliers:

$$\hat{\lambda} = \underset{\lambda \in \mathbb{R}^{K\|N_B\|}}{\operatorname{argmax}} q(\lambda). \quad (13)$$

Solving the Lagrangian dual problem also gives a set of $\hat{x}=[\hat{x}_1, \ldots, \hat{x}_L]$, $\hat{x}_l \in \mathcal{X}_l$, $l=1, \ldots, Z$, which minimize the Lagrangian function:

$$\hat{x} = \operatorname{argmin}_{x_l \in \mathcal{X}_l, l=1, \ldots, Z} L(x, \hat{\lambda}). \quad (14)$$

The Lagrangian duality ensures that $\hat{x}$ minimizes the primal problem (8) or (9). However $\hat{x}$ is not always guaranteed to be primal feasible, since the constraints (8h) or (9h) do not appear in the dual function. Nevertheless, if the utility functions are strictly convex, $\hat{x}$ unique and it must satisfy the primal constraints. Since $U_k(\cdot)$ are strictly convex for the α-fair utility functions (1), solving the dual problem results in a solution of the original optimization.

If the utility functions are not strictly convex, the objective can still be made strictly convex by adding terms, which make it strictly convex. For example, the objective function (8a) and (9b) can be replaced with $$\sum_{l=1}^{Z} \sum_{c_k \in \mathcal{K}_l} U_k(x_k(k)) + \sum_{c_k \in \mathcal{K}} \sum_{n_m \in N_B, a_i \in N_m^-, a_j \in N_m^+} (x_i(k) - x_j(k))^2,$$

which has the same optimum as the primal optimization, due the constraints (8g) and (9h). The square terms ensure the strict convexity of the objective function and assure that the dual solution of (14) is primal feasible.

Aspects of this disclosure describe solutions for the dual problem. The pair of optimizations (12) and (13) gives a way to solve the traffic engineering problem with the dual problem. The solution is found by finding the optimum Lagrangian multipliers $\hat{\lambda}$, which gives a way to find the optimum rate allocation $\hat{x}$ by solving the dual function at the optimum Lagrangian multipliers $q(\hat{\lambda})$.

If the objective function of the primal problem is convex, the dual function is differentiable, which means that the dual problem can be solved using an iterative gradient approach. The gradient of the dual function $\Delta_\lambda q(\lambda)$ is a vector with the same length as λ, where each component of the partial derivative corresponding to an appropriate Lagrangian multiplier as expressed follows:

$$\Delta_\lambda q(\lambda) = \left[ \frac{\partial}{\partial \lambda_1(1)} q(\lambda), \ldots, \frac{\partial}{\partial \lambda_m(k)} q(\lambda), \ldots, \frac{\partial}{\partial \lambda_{\|N_B\|}(K)} q(\lambda) \right].$$

The component of $\Delta_\lambda q(\lambda)$ corresponding to commodity k and node, $n_m \in \mathcal{N}_B(k)$, is given by $$\frac{\partial}{\partial \lambda_m(k)} q(\lambda) = \hat{x}_i(k) - \hat{x}_j(k), a_i \in \mathcal{N}_m^-, a_j \in \mathcal{N}_m^+, \quad (15)$$

where $\hat{x}_i(k)$ is one of the components of $\hat{x}$, which solves $q(\lambda)$.

Once the gradient of the dual function is obtained, the dual problem can be solved using the gradient iteration:

$$\lambda_{t+1} = \lambda_t + \alpha_t \Delta_\lambda q(\lambda_t) \quad (16).$$

It is an elementary result of convex optimization theory that: $\lim_{t \to \infty} \lambda_t = \hat{\lambda}$, where $\hat{\lambda}$ is the optimum set of Lagrangian multipliers as defined in (13). The update (16) is one of many options that can be used to update Lagrangian multipliers. In general, the update is $$\lambda_{t+1} = f_{t+1}(\lambda_t) \quad (17),$$

where $f_{t+1}(\cdot)$ may be a constant function, or dynamically changing function.

The key observation that allows the problem to be solved in a distributed way is that the dual function $q(\lambda)$ is separable. Dual function (10) can be rewritten as $$q(\lambda) = \min_{x_l \in \chi_l, l=1,\ldots,Z} \sum_{l=1}^{L} L_l(x, \lambda) \quad (18)$$

$$= \sum_{l=1}^{L} \min_{x_l \in \chi_l} L_l(x_l, \lambda),$$

where
$$L_l(x_l, \lambda) = \sum_{c_k \in \mathcal{K}_l} U_k(x_k(k)) + \sum_{c_k \in \mathcal{K}} \sum_{a_m \in O_l^-(k)} \lambda_m(k) x_m(k) - \sum_{c_k \in \mathcal{K}} \sum_{a_m \in O_l^+(k)} \lambda_m(k) x_m(k) \quad (19)$$

is the part of Lagrangian function $L(x, \lambda)$, which corresponds to zone l. Since each of the minimizations in the summation has no variables or constraints in common with other minimizations in the summation, the summation and minimization in (18) can be exchanged.

Due to the fact that all of the variables and constraints are grouped in different zones, it is actually possible to solve (18) in a distributed way. The last summation in (18) can be solved as L parallel optimizations, as long as the Lagrangian multipliers are known in each of the parallel optimization. The distributed algorithm is to repeat steps (16) at a central location and each of the sub-optimization in (18) at other locations until the Lagrangian multipliers converge to a value.

Figure 12:
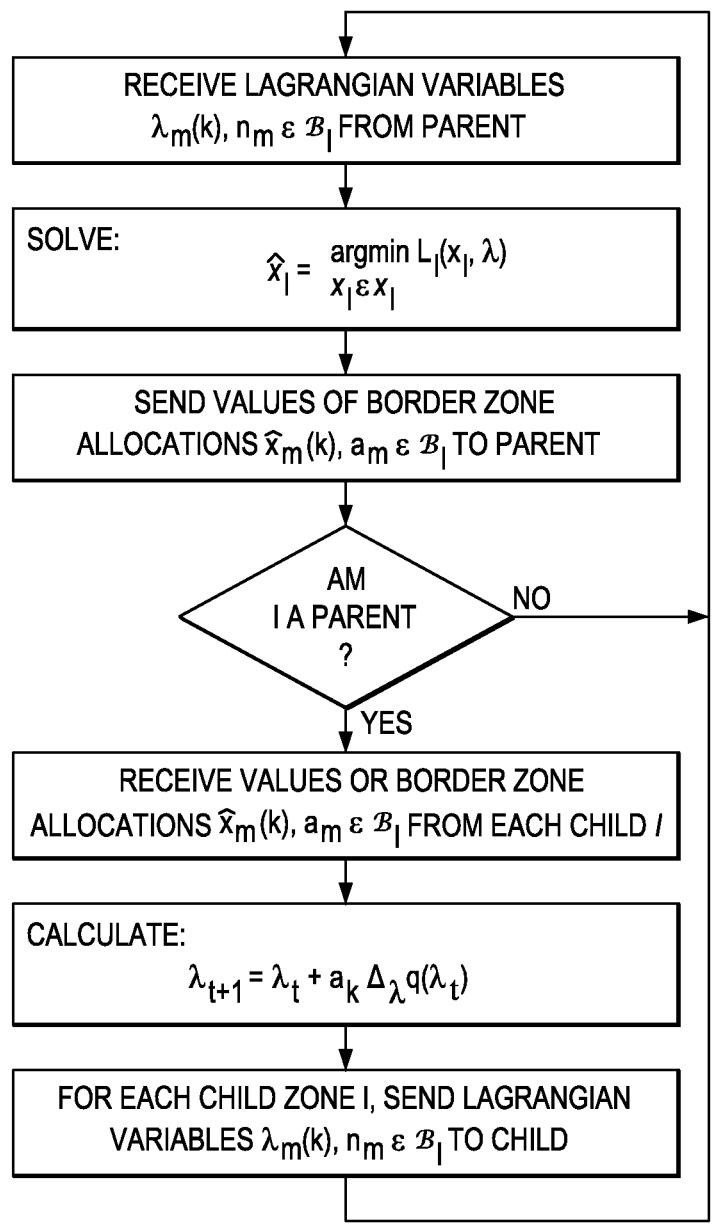
FIG. 12 illustrates a flowchart of an embodiment method for computing Lagrangian variables.

FIG. 12 shows the operation of a hierarchical zone controller in the distributed algorithm. In step 1 of the distributed optimization, zone controllers receive Lagrangian multipliers from their parents. In step 2 the zone controllers solve (18) in each iterations using the Lagrangian multipliers received from their parent to obtain the rate allocations on their zone. Notably, the Lagrangian variables are weights (costs) for the border links, which influence how the traffic engineering optimization in each zone steers the traffic around the zone. In step 3 the children send the traffic allocations on the border links and send this value to the parent. In step 4 and step 5 the parent receives the border allocations and uses them to update border link weights with (16). In step 6 the parent controller sends the updated border weights, which are received by children in step 1.

The algorithm in FIG. 12 can be performed on one node with a single processor where each step is done in a sequence; one node with multiple processors where the parallel steps are performed in parallel on different processors; or on multiple nodes with multiple processors, where the various values are distributed through the network.

There are several options on how the information in different steps can be exchanged. For example, in step 1 the central controller may only need to send the iterate update function $f_{t+1}(\cdot)$ to the children. The children can send the update to the border nodes, which can use the local information to calculate the next Lagrangian variables for the border links. The weights of the links are sent back to the zone controller. This is one obvious enhancement of the algorithm, due to the fact that each Lagrangian multiplier only refers to a given border arc and allocation of rates to flows crossing the arc. This enhancement can greatly reduce the communication overhead of the algorithm. Notably, some of the border nodes may not correspond to actual physical borders (the reverse arcs in the optimization topology). These borders require the source and destination of the flow to exchange the allocated rates on a link.

The evolution of $\lambda_t$ for one particular case of the update function is examined as follows: $f_{t+1}(\lambda_t) = \lambda_t + \Delta_\lambda q(\lambda_t)$. By expanding $\lambda_t$, it can be seen that for a give t the component of $\lambda_t$ as follows:

$$\lambda_m(m) = \sum_{l=0}^{t} \hat{x}_i^{(l)}(k) - \hat{x}_j^{(l)}(k), a_i \in \mathcal{N}_m^-, a_j \in \mathcal{N}_m^+, \text{ where } \hat{x}_i^{(l)}(k)$$

is the allocation on borer link $a_i$ in step 1. If it is assumed that the allocation on the link strictly matches the amount traffic that passed on the link, it is clear that $\lambda_m(m)$ is in fact the queue size on the link. So in step 3 the children zone controllers can send the value of the queues on their links to the parent zone controller, and algorithm should converge to optimum.

Each of the L optimization (18) is in fact a smaller instance of the traffic engineering optimization. A small difference is that more arcs have weights or functions assigned to them than in the original optimization. In a partitioned problem, the Lagrangian multipliers introduce weights on the arcs entering or exiting the zone. The effect of the weights is to change how traffic is distributed in the zone, depending on traffic allocations in other zones. This means that each of these sub-optimizations can be further decomposed into sub-zones with more levels of distributed optimization, leading to a hierarchical SDN controller. Notably, path-based and arc-based optimization in each zones can be mixed, i.e. some of the zones can use path-based optimization, while others can use arc-based optimization.

It is sometimes convenient to have path constraints which additively sum up a function of the allocated rates. In general, it is possible to add a set of constraints $$\sum_{\{a_j \in p_r\}} f_j(x_j(k)) \leq U_r(k), c_k \in \mathcal{K}, p_r \in \mathcal{P}_k. \quad (20)$$

to the optimizations (8) and (9) for each path, in order to model additive path constraints, where functions $f_j(\cdot)$ represent some kind of a cost for using a link on the path and $U_r(k)$ is chosen to limit the cost.

The constraint on paths can be network restrictions. One family of path constraint functions may be related to delay on the path. Suppose that the queue related to commodity k on link $a_j$ is $q_j$, then after traffic engineering, the first transmitted packet will experience the delay of $$d_j(k) = \frac{q_j(k)}{x_j(k)+\varepsilon} + \frac{L_{max}}{C_j}, x_j(k) \geq 0, \varepsilon > 0, \varepsilon \rightarrow 0,$$

where $L_{max}$ is the maximum network packet size and $C_j$ is the link capacity. For the purposes of meeting the Quality-of-Service requirements of the connection, it is possible to add the following constraint to optimization:

$$\sum_{\{a_j \in p_r\}} \left( \frac{q_j(k)}{x_j(k)+\varepsilon} + \frac{L_{max}}{C_j} \right) \leq D_{max}, p_r \in \mathcal{P}_k,$$

where $D_{max}$ is the maximum acceptable delay on any path.

Another family of path constraints may do with security on each link. For example, it may be assumed that a security risk value $\rho_i$ is assigned to each link $a_j$. The security risk may be a function of the ownership of the link and the encryption employed by the connection. For example, it is possible to assign a security risk $\rho_j=0$ if the user uses 128-bit encryption on the path and the zone controller owns the link and $\rho_j=1$ if the user uses 128-bit encryption on the path, but the zone controller does not own the link. It is possible to then add the constraint $$\sum_{\{a_j \in p_r\}} \left( \rho \frac{x_j(k)}{x_k(k)} \right) \leq S_{max}, p_r \in \mathcal{P}_k,$$

where according to (8) and (9) $x_k(k)$ is the total traffic allocated to flow k. The constraint ensures that the total portion of the traffic traversing unsecure links is less than some predetermined number.

Another family of path constraints may do with the cost of traversing the links. For example, not all links may belong to the same service provider and the service provider may have to lease the links from other providers. The provider may make it a rule that it should not spend more than some predetermined amount of money to serve the traffic of a particular flow. In that case, a constraint such as:

$$\sum_{\{a_j \in p_r\}} c_j x_j(k) \leq C_{max}, p_r \in \mathcal{P}_k,$$

where $c_j$ is the cost of traversing the link $a_j$ ensures that the total cost on any path serving the link does not exceed $C_{max}$.

It is possible to modify the Lagrangian dual to handle the constraint in a distributed way. First, the path constraints are transferred into the objective function to obtain a new Lagrange function $$L_{PATH}(x, \lambda, \mu) = L(x, \lambda) + \sum_{c_k \in \mathcal{K}} \sum_{p_r \in \mathcal{P}_k} \mu_r(k) \left[ \sum_{\{a_j \in p_r\}} f_j(x_j(k)) - U_p(k) \right], \quad (21)$$

where $\lambda$ and $L(x, \lambda)$ are defined in (10), and $\mu$ is the set of Lagrangian multipliers associated with path constraints, $$\mu = [\mu(1), \ldots, \mu(K)], \text{ where } \mu(k) = [\mu_1(k), \ldots, \mu_{\|\mathcal{P}_k\|}(k)]$$

is the vector of Lagrangian variables for commodity k associated with the path constraint (15).

The dual function for the optimization is the minimization of the Lagrange function over x and can be expressed as:

$$q_{PATH}(\lambda, \mu) = \min_{x_l \in X_l, l=1, \ldots, Z} L(x, \lambda, \mu).. \quad (22)$$

The dual problem finds the set of Lagrange multipliers:

$$\max_{\substack{\lambda \in \mathbf{R}^{K\|N_B\|} \\ \mu \geq 0}} q_{PATH}(\lambda, \mu) \quad (23)$$

and the optimal set of Lagrange multipliers $$[\hat{\lambda}, \hat{\mu}] = \operatorname*{argmax}_{\substack{\lambda \in \mathbf{R}^{K\|N_B\|} \\ \mu \geq 0}} q_{PATH}(\lambda, \mu). \quad (24)$$

define the optimum solution of the traffic engineering optimization through $$\hat{x} = \operatorname*{argmin}_{x_l \in X_l, l=1, \ldots, Z} L(x, \hat{\lambda}, \hat{\mu}).$$

The dual problem with the new Lagrangian variables can be solved with the gradient descent algorithm similar to the original dual problem (12). The derivative of $q_{PATH}(\lambda, \mu)$ can be found similarly to how the derivative of $q(\lambda, \mu)$ was found. Due to the separability of $\lambda$ and $\mu$, the following is obtained: $\Delta_\lambda q_{PATH}(\lambda, \mu) = \Delta_\lambda q(\lambda)$, where components $\Delta_\lambda L(\lambda)$ are defined by (15). Second, it is possible to find the components of the derivative of $\Delta_\mu q_{PATH}(\lambda, \mu)$, which is the first derivative of $q_{PATH}(\lambda, \mu)$ with respect to $\mu$ can be found in a similar way to (15). The component of $\Delta_\mu q_{PATH}(\lambda, \mu)$ corresponding to r-th path of commodity k can be found with $$\frac{\partial}{\partial \mu_r(k)} q_{PATH}(\mu, \lambda) = \sum_{\{a_j \in p_r\}} f_j(\hat{x}_j(k)) - U_p(k), p_r \in \mathcal{P}_k, \quad (25)$$

where $\hat{x}_j(k)$ is one of the components of $\hat{x}$, which solve $L_{PATH}(x, \mu, \lambda)$.

The gradient descent for the dual problem (23) involves two steps:

$$\lambda_{t+1} = \lambda_t + \alpha_t \Delta_\lambda q_{PATH}(\mu, \lambda) \quad (26a)$$

and $$\mu_{t+1} = [\alpha_t + \Delta_\mu \Delta_\mu q_{PATH}(\mu, \lambda)]^+ \quad (26b),$$

where $[x]^+ = \max\{0, x\}$ is the projection on the real line. It is a fundamental result of convex optimization theory that $\lim_{t \to \infty} \lambda_t = \hat{\lambda}$, and $\lim_{t \to \infty} \mu_t = \hat{\mu}$, where $\hat{\lambda}$ and $\hat{\mu}$ are the optimum set of Lagrangian multipliers as defined by (24).

Figure 16:
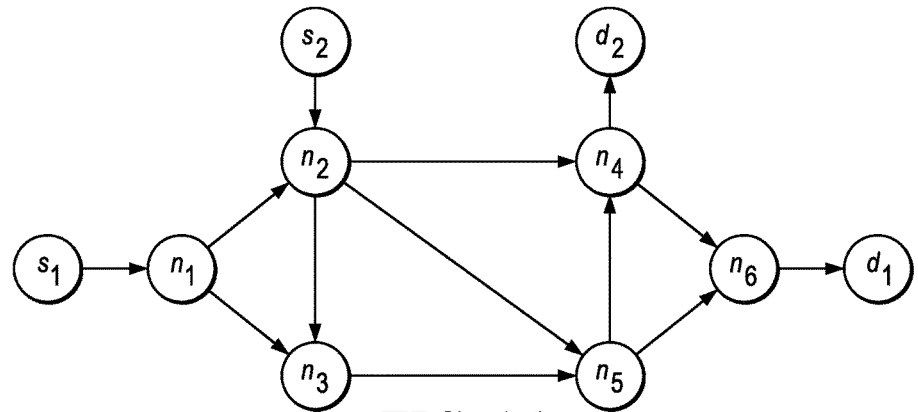
FIG. 16 illustrates a diagram of yet another embodiment hierarchical SDN configuration.

To distribute the problem with path constraints, it is possible to group the constraints in the last summation of Lagrangian function (21) into zones. If a path traverses multiple zones its additive path constraints should be split according to the zones. It is then possible to give a simple example of how to split the path across two zones, but this example can be easily extended to multiple zones. Suppose that the path traverses zones $Z_k$ and $Z_l$, which are connected by arc $a_m$ (FIG. 16). As a result, the following is obtained:

$$\sum_{\{a_j \in p_r\}} f_j(x_j(k)) = \sum_{\{a_j \in p_r^{(k)}\}} f_j(x_j(k)) + 0 \cdot x_m^-(k) + f_m(x_m^+(k)) + \sum_{\{a_j \in p_r^{(l)}\}} f_j(x_j(k)) \leq U_p, p \in \mathcal{P}_k,$$

where $p_r^{(k)}$ the segment of $p_l$ in $Z_k$, $p_r^{(k)} = p_r \cap \mathcal{A}_k$, and $p_r^{(l)}$ is the segment of $p_l$ in $Z_l$. Here it is possible to use the convention that any function associated with a border link $a_m$ is associated with the outgoing link of border node $n_m$, $a_m^+$. In general, it is possible to use the transformation on the constraints, which takes a function $f_m(\cdot)$ associated with a border arc $a_m$ and creates two new functions:

$$f_m(x_m) \rightarrow \begin{cases} f_i(x_i) = f_m(x_i), & a_i \in \mathcal{N}_m^- \\ f_j(x_j) = 0 \cdot x_i, & a_j \in \mathcal{N}_m^+ \end{cases}.$$

Using the convention, it is possible rewrite the above expression as follows:

$$\sum_{c_k \in \mathcal{K}} \sum_{p_r \in \mathcal{P}_k} \mu_r(k) \left[ \sum_{\{a_j \in p_r\}} f_j(x_j(k)) - U_r(k) \right] =$$

$$\sum_{l=1}^{Z} \sum_{c_k \in \mathcal{K}_l} \sum_{p_r \in \mathcal{P}_k} \mu_r(k) \left( \sum_{\{a_j \in p_r^{(l)}\}} f_j(x_j(k)) \right) - \sum_{l=1}^{Z} \sum_{c_k \in \mathcal{K}_l} \sum_{p_r \in \mathcal{P}_k} \mu_r(k) U_r(k),$$

where $p_r^{(l)}$ is the segment of path r passing through zone l and $\mathcal{K}_l$ is the set of commodities that appear in zone l.

So, the Lagrangian function can also be rewritten as:

$$L_{PATH}(\mu, \lambda) = \min_{x_l \in X_l} \sum_{l=1}^{L} L_l(\mu, \lambda) = \sum_{l=1}^{L} \min_{x_l \in X_l} L_l(\mu, \lambda),$$

where $L_l(\mu, \lambda) = L_l(\mu) +$ $$\sum_{c_k \in \mathcal{K}_l} \sum_{p_r \in \mathcal{P}_k} \sum_{\{a_j \in p_r^{(l)}\}} \mu_r(k) f_j(x_j(k)) - \sum_{c_k \in \mathcal{K}_l} \sum_{p_r \in \mathcal{P}_k} \mu_r(k) U_r(k) \text{ and } L_l(\mu)$$

was defined in (21).

Figure 13:
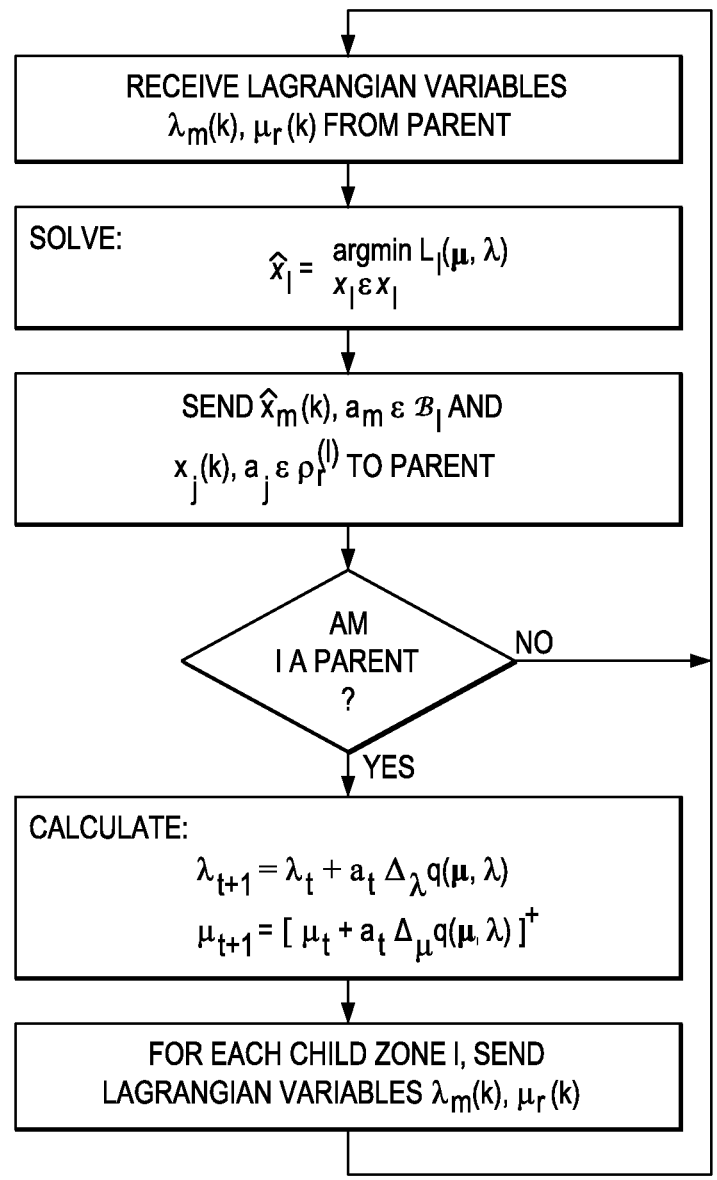
FIG. 13 illustrates a flowchart of another embodiment method for computing Lagrangian variables.

Given the derivatives a distributed algorithm based on gradient descent can be made similar to the one presented in FIG. 12, and the algorithm is shown in FIG. 13

As with the case of the distributed algorithm in FIG. 12, this algorithm can also be made more efficient. One version of the algorithm is that each zone controller sends the values of the allocations of rates on the paths requested by the zone controller (FIG. 13). Another version is that the zone controller calculates $$\sum_{\{a_j \in p_r^{(l)}\}} f_j(x_j(k))$$

for its segment of the paths and sends it to the parent controller. Notably, in case of measurable quantities, such as delay, it is not even necessary to know the expression for the quantity that should be bounded. The zone controller can measure the value of the quantity required by the parent controller on its segment of the path and send the measurement to the parent controller.

Aspects of the disclosure provide techniques for distributed optimization based on flow zones. It is now possible to re-formulate the traffic optimization problem to group flows together. In this formulation, zones are defined as groups of flows. The optimization is distributed using the optimization graph $\mathcal{G}_{OPT}(\mathcal{N}_T, \mathcal{A}_F)$.

Aspects of the disclosure provide techniques for partitioning of traffic engineering optimization according to flow grouping. Network is divided into Z zones, $\mathcal{Z}_1, \ldots, \mathcal{Z}_Z$, where each zone is a subset of the flows (commodities) $\mathcal{Z}_l \subseteq \mathcal{K}$, $l=1, \ldots L$, and each commodity is in one zone only $$\bigcup_{l=1}^{Z} \mathcal{Z}_l = \mathcal{K} \text{ and } \bigcap_{l=1}^{Z} \mathcal{K} = \emptyset.$$

Nodes and arcs are not classified into zones. However, for mathematical convenience, it is possible to distinguish between the arcs which are inner to a zone and the arcs which are in the border of multiple zones.

Arcs inner to a zone are the arcs, which are only used by the commodities in that zone. Mathematically, it is possible to define arcs inner to zone $\mathcal{Z}_l$ with $$\mathcal{I}_l = \left\{ a_j \in \bigcup_{c_k \in \mathcal{Z}_l} \mathcal{A}_F(k) \,\middle|\, a_j \notin \bigcup_{\{c_k \in \mathcal{K} | c_k \notin \mathcal{Z}_l\}} \mathcal{A}_F(k) \right\},$$

where $\mathcal{A}_F(k) \subseteq \mathcal{A}_F$ is the set of arcs in the graph $\mathcal{G}_{OPT}(\mathcal{N}_T, \mathcal{A}_F)$, which are used by commodity k. Arcs in the border of multiple nodes are the arcs, which are shared by commodities belonging to multiple zones. It is possible to denote a set of arc in the border of multiple nodes with $\mathcal{B}_m \subseteq \mathcal{A}_F$. There may be M border zones defined $\mathcal{B}_1, \ldots, \mathcal{B}_M$ depending on how the flows are portioned. It is possible to define the set of commodities surrounding border arcs as $\mathcal{S}_m \subseteq \mathcal{K}$ for a border zone $\mathcal{B}_m$, as the flows of any zone sharing the links in the border zone $\mathcal{B}_m$. Mathematically, the surrounding nodes are defined as follows: $\mathcal{S}_m = \{c_k \in \mathcal{K} | \exists a_j \epsilon a_j \epsilon \mathcal{A}_F(k)\}$.

The traffic engineering optimization (8) can be re-formulated keeping in mind the grouping of flows into groups. The formulation is as follows:

$$\min \sum_{l=1}^{Z} \sum_{c_k \in \mathcal{Z}_l} U_k(x_k(k)); \quad (27a)$$

$$\sum_{a_j \in \mathcal{N}_i^+ \cap \mathcal{A}_F(k)} x_j(k) - \sum_{a_j \in \mathcal{N}_i^- \cap \mathcal{A}_F(k)} x_j(k) = 0, \quad (27b)$$

$$n_i \in \mathcal{N}_T, c_k \in \mathcal{Z}_l, l=1, \ldots, Z;$$

$$\sum_{\{k|a_j \in \mathcal{A}_T(k)\}} x_j(k) \le C_j, a_j \in \mathcal{J}_l, l = 1, \ldots, Z; \quad (27c)$$

$$\{C_j \mid a_j = \mathcal{W}_g\} \in C_g, \mathcal{W}_g, g = 1, \ldots, G; \quad (27d)$$

$$x_j(k) \ge 0, a_j \in \mathcal{A}_F; \quad (27e)$$

$$\sum_{c_k \in S_m} x_j(k) \le C_j, a_j \in \mathcal{B}_m, m = 1, \ldots, B. \quad (27f)$$

The objective function (27a) groups utility functions according to the membership of their owner flows in groups. The conservation of flows constraint (27b) ensures that no flow is allocated to much or too little rate on the incoming and outgoing arcs of a node. The arc capacity constraint (27b) ensures that inner arcs of the zone do not exceed their capacity allocations. Constraints (27d) ensure that the capacity of the links is not exceeded. Constraint (27f) ensures the capacity of the arcs on the border of multiple zones is not exceeded. Finally, constraint (27e) ensures that the rate allocations are positive.

Optimization (27) partitions the arc-based traffic engineering problem according to the zone membership of flows. The only common constraint where flows of multiple zones are related is constraint (27f).

Partitioning of the traffic engineering problem with path-based constraints. The path-based traffic engineering optimization can be similarly partitioned as follows:

$$\min \sum_{l=1}^{Z} \sum_{c_k \in Z_l} U_k(x_k(k)); \quad (28a)$$

$$x_k^{(k)} - \sum_{p_r \in \mathcal{P}_k} h_r(k) = 0, a_k \in \mathcal{A}_{COM}(k), c_k \in Z_l, l = 1, \ldots, Z; \quad (28b)$$

$$x_j(k) - \sum_{\{p_r \in \mathcal{P}_k | a_j \in \mathcal{P}_k\}} h_r(k) = 0, a_j \in \mathcal{A}_T(k), c_k \in Z_l, l = 1, \ldots, Z; \quad (28c)$$

$$\sum_{\{k|a_j \in \mathcal{A}_T(k)\}} x_j(k) \le C_j, a_j \in \mathcal{J}_l, l = 1, \ldots, Z; \quad (28d)$$

$$\{C_j \mid a_j = \mathcal{W}_g\} = C_g, \mathcal{W}_g, g = 1, \ldots, G; \quad (28e)$$

$$x_j(k) \ge 0, a_j \in \mathcal{A}_F; \quad (28f)$$

$$\sum_{c_k \in S_m} x_j(k) \le C_j, a_j \in \mathcal{B}_m, m = 1, \ldots, B. \quad (28g)$$

The objective function (27a) groups the utility functions according to the zone membership. The constraints (27b) and (27c) calculate the total amount of traffic allocated to a flow on an arc, which is traversed by the paths associated with the flow. Constraint (27d) ensures that the total traffic allocated on arcs internal to the zone does not exceed the capacity of the link. Constraints (27e) specify the capacity on the arcs. Constraint (27g) ensures that the capacity allocated on arcs shared between the zones is not exceeded. Finally, constraint (27f) ensures that rate allocations on arcs are not negative.

The optimizations (27) and (28) can be distributed using a similar technique use to distribute optimizations (8) or (9). It is possible to now show how to formulate the Lagrangian dual of optimizations (27) and (28) and show a distributed algorithm to solve the optimization based on flow zoning.

To formulate the Lagrangian dual problem, the Lagrange function for optimization (27) and (28) can be expressed as follows:

$$L(x, \mu) = \sum_{l=1}^{Z} \sum_{c_k \in Z_l} U_k(x_k(k)) + \sum_{m=1}^{M} \sum_{a_j \in \mathcal{B}_m} \mu_m(j) \left[\sum_{c_k \in S_m} x_j(k) - C_j\right] = \quad (29)$$

$$\sum_{l=1}^{Z} \left(\sum_{c_k \in Z_l} U_k(x_k(k)) + \sum_{m=1}^{M} \sum_{a_j \in \mathcal{B}_m} \sum_{c_k \in S_m \cap Z_l} \mu_m(j) x_j(k)\right) -$$

$$\sum_{m=1}^{M} \sum_{a_j \in \mathcal{B}_m} \mu_m(j) C_j,$$

where a Lagrangian variable is introduced for each constraint (27g), $\mu = [\mu_1, \ldots, \mu_m]$ and $\mu_l = [\ldots, \mu_l(j), \ldots]$, $a_j \in \mathcal{B}_m$ are the Lagrangian multipliers for arcs in the border zone $\mathcal{B}_m$. It is possible to transform the second summation using the following:

$$S_m = S_m \cap \left(\bigcup_{l=1}^{Z} Z_l\right) = \bigcup_{l=1}^{Z} (S_m \cap Z_l)$$

due to the fact that sets $Z_l$ are non-overlapping.

The dual function for the optimization is the minimization of the Lagrange function over x as follows:

$$q(\mu) = \min_{x_l \in X_l, l=1, \ldots, Z} L(x, \mu), \quad (30)$$

where $x_l \in X_l$ is the set of $x_l$, which conform to constraints (27b)-(27e) or (28b)-(28f), depending on weather the primal problem uses arc-based or path-based constraints. The dual problem finds the set of Lagrange multipliers:

$$\max_{\mu \ge 0} q(\mu) \quad (31)$$

and the optical set of Lagrange multipliers $$\hat{\mu} = \operatorname*{argmax}_{\mu \ge 0} q(\mu) \quad (32)$$

define the optimum solution of the traffic engineering optimization through $$\hat{x} = \operatorname*{argmin}_{x_l \in X_l, l=1, \ldots, Z} L(x, \hat{\mu}).$$

The dual problem can be solved with the gradient descent algorithm since the dual function is differentiable in terms of the Lagrangian multipliers. The component of $\Delta_\mu q(\mu)$ corresponding to arc j in m-th border zone can be found with $$\frac{\partial}{\partial \mu_m(j)} q(\mu) = \sum_{c_k \in S_m} x_j(k) - C_j, a_j \in \mathcal{B}_m, \quad (33)$$

$$m = 1, \ldots, B.$$

Figure 14:
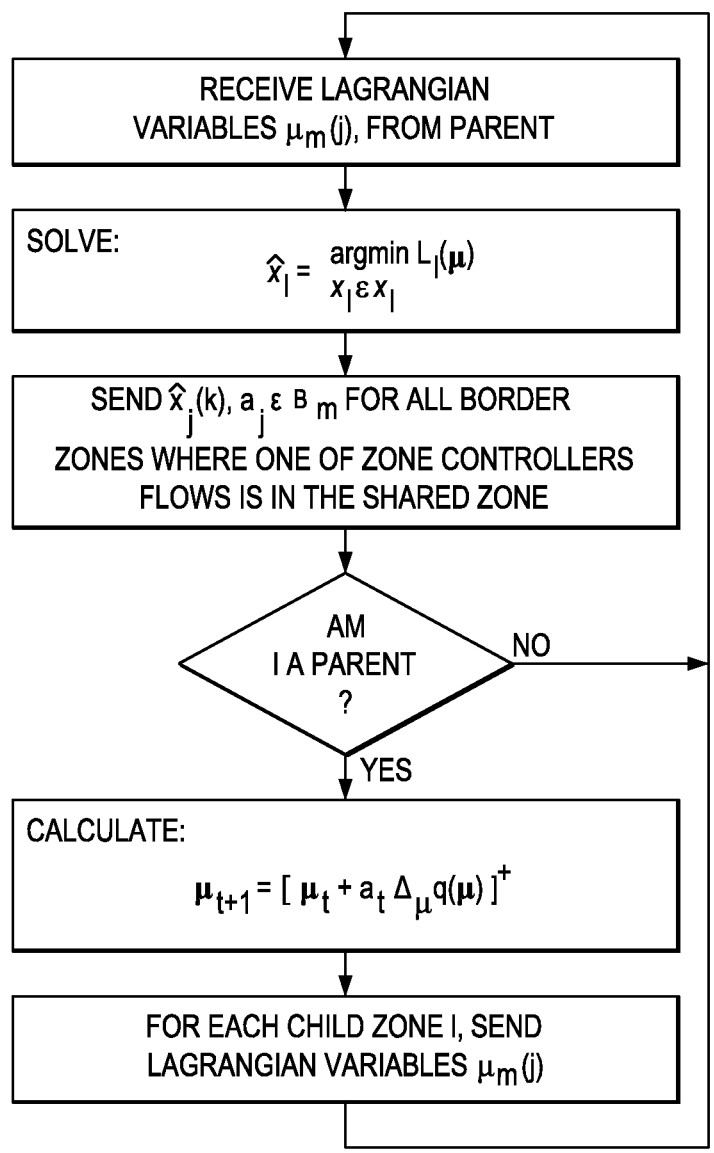
FIG. 14 illustrates a flowchart of yet another embodiment method for computing Lagrangian variables.

The gradient descent for the dual problem (31) involves repeated application of the following step:

$$\mu_{t+1} = [\mu_t + \alpha_t \Delta_\mu q(\mu)]^+ \quad (34),$$

where $[x]^+ = \max\{0, x\}$ is the projection on the real line. It is an elementary result of convex optimization theory that $\lim_{t \to \infty} \mu_t = \hat{\mu}$, where $\hat{\mu}$ are the optimum set of Lagrangian multipliers as defined by (32). Aspects of this disclosure provide techniques for solving a distributed optimization algorithm. The key to calculating the dual problem in a distributed way is to take advantage of the special structure of the Lagrangian function. Due to the structure of the Lagrangian function, it is possible to write $$q(\mu) = \min_{x_l \in X_l, l=1, \ldots, Z} L(x, \mu) = \quad (35),$$

$$\min_{x_l \in X_l, l=1, \ldots, Z} \left\{ \sum_{l=1}^{Z} L_l(\mu) - \sum_{m=1}^{M} \sum_{a_j \in \mathcal{B}_m} \mu_m(j) C_j \right\} =$$

$$\sum_{l=1}^{Z} \min_{x_l \in X_l, l=1, \ldots, Z} L_l(\mu) -$$

$$\sum_{l=1}^{Z} \min_{x_l \in X_l, l=1, \ldots, Z} \sum_{m=1}^{M} \sum_{a_j \in \mathcal{B}_m} \mu_m(j) C_j,$$

where $L_l(\mu) = \sum_{c_k \in Z_l} U_k(x_k(k)) + \sum_{m=1}^{M} \sum_{a_j \in \mathcal{B}_m} \sum_{c_k \in S_m \cap Z_l} \mu_m(j) x_j(k).$ The distributed dual optimization is shown in FIG. 14.

Figure 15:
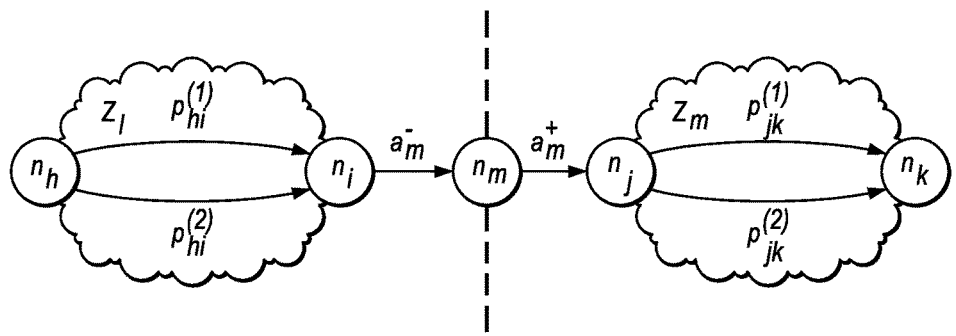
FIG. 15 illustrates a diagram of yet another embodiment hierarchical SDN configuration.

Aspects of this disclosure achieve complexity reduction via distributed optimization. Notably, path segments in each zone can be treated separately and that this greatly reduces the complexity of the optimization in each zone. FIG. 15 shows two zones and four path segments, belonging to the zones. In zone $Z_l$, nodes $n_h$ and $n_i$ are connected with paths $p_{hi}^{(1)}$ and $p_{hi}^{(2)}$, while in zone $Z_m$ nodes $n_j$ and $n_k$ are connected with paths $p_{jk}^{(1)}$ and $p_{jk}^{(2)}$. Even though each zone only has two paths, viewed globally, there are actually four paths. For example, if it is considered that the optimization graph of the paths are $P_1 = p_{hi}^{(1)} \cup \{a_m\} \cup p_{jk}^{(1)}$, $P_2 = p_{hi}^{(1)} \cup \{a_m\} \cup p_{jk}^{(2)}$, $P_3 = p_{hi}^{(2)} \cup \{a_m\} \cup p_{jk}^{(1)}$, and $P_4 = p_{hi}^{(2)} \cup \{a_m\} \cup p_{jk}^{(2)}$. So with this example, the global optimization (9) would have four path variables, while each of the zone controllers only has two path variables when solving (18).

FIG. 16 shows an example network with 6 nodes $n_1$, $n_2$, $n_3$, $n_4$, $n_5$, $n_6$ and two end-to-end flows $(s_1, d_1)$ and $(s_2, d_2)$. The distinction between nodes $n_1$, $n_2$, $n_3$, $n_4$, $n_5$, $n_6$ and $s_1$, $s_2$, $d_1$, $d_2$ is that nodes $n_1$, $n_2$, $n_3$, $n_4$, $n_5$, $n_6$ can be controlled by a network controller, while nodes $s_1$, $s_2$, $d_1$, $d_2$ can be considered as "hosts" and are beyond the control of the network. The links shown in the network only allow traffic in one directions (indicated by the arrow), but bi-directional links can also be modeled by adding pairs of opposing directed links.

Techniques of this disclosure explain how to find optimize bandwidth allocation on the links, so that a certain kind of fairness is experienced by the two end-to-end flows. Further, it may be desirable for the optimization to be done in a distributed way where red nodes $n_1$, $n_2$, $n_3$ are controlled by one controller and nodes $n_4$, $n_5$, $n_6$ are controlled by a different controller.

Figure 17:
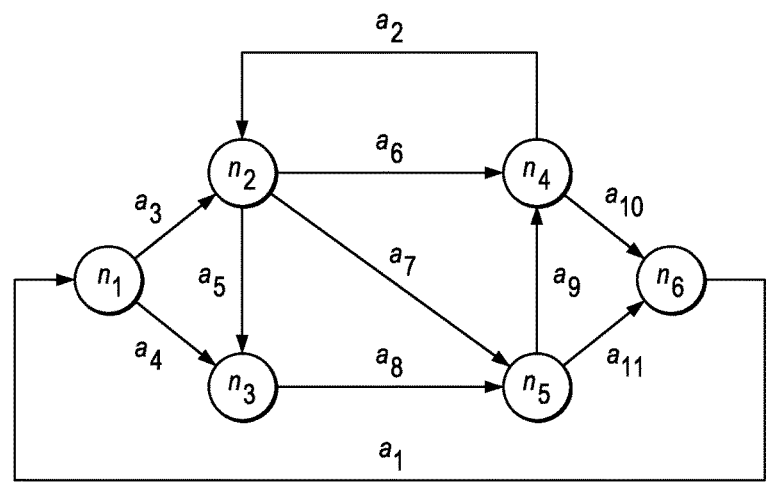
FIG. 17 illustrates a diagram of yet another embodiment hierarchical SDN configuration.

It is possible to formulate the problem as a minimum convex network flow optimization. FIG. 17 shows the graph used to model the network in FIG. 16. All of the nodes, except for sources and destinations are included in the graph. All of the links between those nodes are also included in the graph. In addition, for each pair of source and destination nodes, an arc from the destination to the source is included. This arc is used to ensure that the conservation of flows constraints is satisfied throughout the network. It is possible to label the two arcs from the destination to the sources to correspond their flow index $a_1$ corresponds to $(s_1, d_1)$ and $a_2$ corresponds to $(s_2, d_2)$.

Given the graph in FIG. 17, it is possible to formulate the following optimization problem:

$$\min_{x_1, \ldots, x_{11}} U_1(x_1^{(1)}) + U_2(x_2^{(2)}); \quad (36)$$

$$x_1^{(m)} - (x_3^{(m)} + x_4^{(m)}) = 0, m = 1, 2 \text{ at } n_1; \quad (37)$$

$$(x_2^{(m)} + x_3^{(m)}) - (x_5^{(m)} + x_6^{(m)} + x_7^{(m)}) = 0, m = 1, 2 \text{ at } n_2; \quad (38)$$

$$(x_4^{(m)} + x_5^{(m)}) - x_8^{(m)} = 0, m = 1, 2 \text{ at } n_3; \quad (39)$$

$$(x_6^{(m)} + x_9^{(m)}) - (x_2^{(m)} + x_{10}^{(m)}) = 0, m = 1, 2 \text{ at } n_4; \quad (40)$$

$$(x_7^{(m)} + x_8^{(m)}) - (x_9^{(m)} + x_{11}^{(m)}) = 0, m = 1, 2 \text{ at } n_5; \quad (41)$$

$$(x_{10}^{(m)} + x_{11}^{(m)}) - x_1^{(m)} = 0, m = 1, 2 \text{ at } n_6; \quad (42)$$

$$0 \leq \sum_{m=1}^{2} x_i^{(m)} \leq R_i \, i = 1, \ldots, 11. \quad (43)$$

The optimization seeks to find the set of flows that maximize (36), which is a sum of utility functions for the total flow allocated to each end-to-end flow. It is possible to use the notation that $x_1$ is the flow on arc $a_1$. Notably, the solution finds flow allocation on each arc in the network $x_1, \ldots, x_{11}$. In some embodiments, flows $x_1$ and $x_2$ are of primary significance from the end-to-end flow point of view. In the objective, m refers to the index of the flow (which is referred to as commodity later). The utility functions are chosen so that at the optimum, commodities satisfy some type of fairness (i.e. $\alpha$-fairness). Constraints (37)-(42) represent the conservation of flow constraints for each commodity. Finally, constraint (43) insures that the capacity of links is not exceeded by all commodities on the link.

Figure 18:
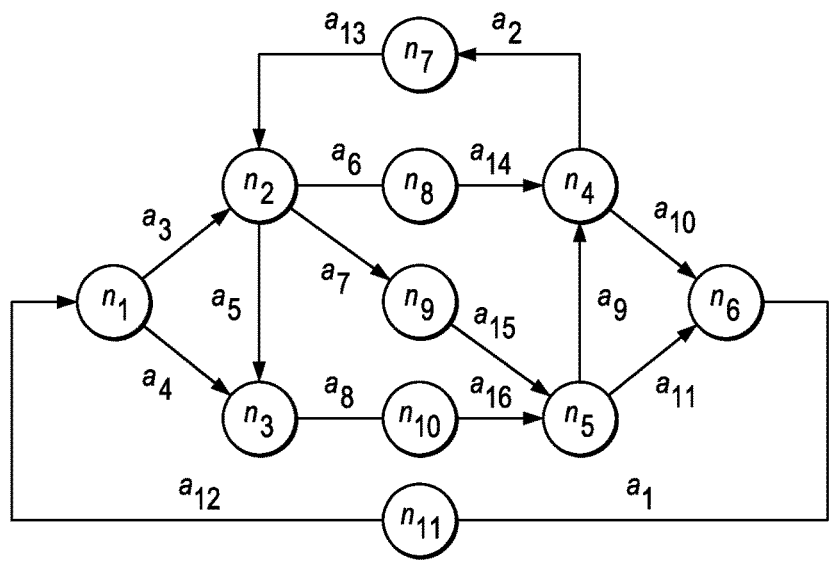
FIG. 18 illustrates a diagram of yet another embodiment hierarchical SDN configuration.

To model the partitioning of the problem, it is possible to convert the graph in the graph in FIG. 18. The nodes are portioned in two groups: red nodes $n_1$, $n_2$, $n_3$ and blue nodes $n_4$, $n_5$, $n_6$. For each of the arcs connecting the two partitions $a_1$, $a_2$, $a_6$, $a_7$, $a_8$, a node and another arc are introduced so that the flows obtained in the new graph are equivalent to the flows in the original graph. Consider arc $a_1$ in FIG. 17, which connects nodes $n_6$ and $n_1$. Node $n_{11}$ is added, and arc $a_1$ is used to connect nodes $n_6$ and $n_{11}$, and add arc $a_{12}$ and use it to connect node $n_{11}$ and $n_1$.

The graph lends itself to the optimization:

$$\min_{x_1, \ldots, x_{16}} \sum_{m=1}^{2} U_m(x_m^{(m)}); \quad (44)$$

-continued $$x_{12}^{(m)} - (x_3^{(m)} + x_4^{(m)}) = 0, m = 1, 2 \text{ at } n_1; \quad (45)$$

$$(x_{13}^{(m)} + x_3^{(m)}) - (x_5^{(m)} + x_6^{(m)} + x_7^{(m)}) = 0, m = 1, 2 \text{ at } n_2; \quad (46)$$

$$(x_4^{(m)} + x_5^{(m)}) - x_8^{(m)} = 0, m = 1, 2 \text{ at } n_3; \quad (47)$$

$$(x_{14}^{(m)} + x_9^{(m)}) - (x_2^{(m)} + x_{10}^{(m)}) = 0, m = 1, 2 \text{ at } n_4; \quad (48)$$

$$(x_{15}^{(m)} + x_{16}^{(m)}) - (x_9^{(m)} + x_{11}^{(m)}) = 0, m = 1, 2 \text{ at } n_5; \quad (49)$$

$$(x_{10}^{(m)} + x_{11}^{(m)}) - x_1^{(m)} = 0, m = 1, 2 \text{ at } n_6; \quad (50)$$

$$x_2^{(m)} - x_{13}^{(m)} = 0, m = 1, 2 \text{ at } n_7; \quad (51)$$

$$x_6^{(m)} - x_{14}^{(m)} = 0, m = 1, 2 \text{ at } n_8; \quad (52)$$

$$x_7^{(m)} - x_{15}^{(m)} = 0, m = 1, 2 \text{ at } n_9 \quad (53)$$

$$x_8^{(m)} - x_{16}^{(m)} = 0, m = 1, 2 \text{ at } n_{10}; \quad (54)$$

$$x_1^{(m)} - x_{12}^{(m)} = 0, m = 1, 2 \text{ at } n_{11}; \quad (55)$$

$$0 \leq \sum_{m=1}^{2} x_i^{(m)} \leq R_i \, i = 1, \ldots, 16 \quad (56)$$

The objective function in the optimization (44) is the same as in the previous optimization, as are the constraints (45)-(50), which correspond to conservation of flows at the original nodes in the network. Constraints (51)-(55) represent the conservation of flows constraints at the newly added nodes. Constraints (56) correspond to the capacity limit on all arcs in the network.

To solve this problem as two partitions, it is possible to use the dual of the problem, which can be formulated as two separate optimizations with shared data. The shared data corresponds to the dual variables for the constraints related to the nodes in the partition.

In the dual problem context, it is possible to introduce Lagrangian multipliers $p_1^{(1)}, \ldots, p_5^{(1)}, p_1^{(2)}, \ldots, p_5^{(2)}$ corresponding to constraints (51)-(55) to formulate the Lagrangian function for the primal problem:

$$L(p) = \min_{x_1^{(1)}, \ldots, x_{16}^{(1)}, x_1^{(2)}, \ldots, x_{16}^{(2)} \in \mathcal{X}} \sum_{m=1}^{2} [U_m(x_m^{(m)}) +$$

$$p_1^{(m)}(x_2^{(m)} - x_{13}^{(m)}) + p_2^{(m)}(x_6^{(m)} - x_{14}^{(m)}) +$$

$$p_3^{(m)}(x_7^{(m)} - x_{15}^{(m)}) + p_4^{(m)}(x_8^{(m)} - x_{16}^{(m)}) + p_5^{(m)}(x_1^{(m)} - x_{12}^{(m)})],$$

where $p=[p_1^{(1)}, \ldots, p_5^{(1)}, p_1^{(2)}, \ldots, p_5^{(2)}]^T$ is a vector of Lagrangian variables and $\mathcal{X}$ is the set of 16-tuples $x_1^{(1)}, \ldots, x_{16}^{(1)}, x_1^{(2)}, \ldots, x_{16}^{(2)}$ that satisfy constraints (45)-(50) and (56).

This disclosure denotes $\hat{x}(p) = [\hat{x}_1^{(1)}(p), \ldots, \hat{x}_{16}^{(1)}(p), \hat{x}_1^{(2)}(p), \ldots, \hat{x}_{16}^{(2)}(p)]^T$ as the solution of the optimization in function $L(p)$, $$\hat{x}(p) = argmin_{x_1^{(1)}, \ldots, x_{16}^{(1)}, x_1^{(2)}, \ldots, x_{16}^{(2)} \in \mathcal{X}} \sum_{m=1}^{2} [U_m(x_m^{(m)}) + p_1(x_2^{(m)} - x_{13}^{(m)}) +$$

$$p_2(x_6^{(m)} - x_{14}^{(m)}) + p_3(x_7^{(m)} - x_{15}^{(m)}) + p_4(x_8^{(m)} - x_{16}^{(m)}) + p_5(x_1^{(m)} - x_{12}^{(m)})].$$

The partitioned algorithm works with the dual optimization. Before showing the partitioned algorithm, it is useful to show some properties of the dual problem.

First, from duality theory of convex programming, it is possible to obtain a p that solves:

$$\hat{p} = argmin_{p \in \mathcal{R}^{10}} L(p),$$

then $\hat{x}(\hat{p})$ solves the primal problem. Second, L(p) is differentiable and $$\frac{\partial}{\partial p} L(p)$$

is difference between the constraints corresponding to Lagrangian variables:

$$\frac{\partial}{\partial p} L(p) = \begin{bmatrix} \hat{x}_2^{(1)}(p) - \hat{x}_{13}^{(1)}(p), \hat{x}_6^{(1)}(p) - \hat{x}_{14}^{(1)}(p), \\ \hat{x}_7^{(1)}(p) - \hat{x}_{15}^{(1)}(p), \hat{x}_8^{(1)}(p) - \hat{x}_{16}^{(1)}(p), \\ \hat{x}_1^{(1)}(p) - \hat{x}_{12}^{(1)}(p), \hat{x}_2^{(2)}(p) - \hat{x}_{13}^{(2)}(p), \\ \hat{x}_6^{(2)}(p) - \hat{x}_{14}^{(2)}(p), \hat{x}_7^{(2)}(p) - \hat{x}_{15}^{(2)}(p), \\ \hat{x}_8^{(2)}(p) - \hat{x}_{16}^{(2)}(p), \hat{x}_1^{(2)}(p) - \hat{x}_{12}^{(2)}(p) \end{bmatrix}.$$

Third, due to the use Lagrangian variables which transferred some of the constraints to the objective function, it is now possible to separate the problem into two optimizations $L(p) = L_1(p) + L_2(p)$, where $$L_1(p) = \min_{\substack{x_3^{(1)}, \ldots, x_8^{(1)}, x_{12}^{(1)}, x_{13}^{(1)} \in \mathcal{X}_1 \\ x_3^{(2)}, \ldots, x_8^{(2)}, x_{12}^{(2)}, x_{13}^{(2)}}} \sum_{m=1}^{2} \begin{bmatrix} p_2^{(m)} x_6^{(m)} + \\ p_3^{(m)} x_7^{(m)} + p_4^{(m)} x_8^{(m)} - \\ p_5^{(m)} x_{12}^{(m)} - p_1^{(m)} x_{13}^{(m)} \end{bmatrix}, \text{ and}$$

$$L_2(p) =$$

$$\min_{\substack{x_1^{(1)}, \ldots, x_2^{(1)}, x_9^{(1)}, \ldots, x_{11}^{(1)}, x_{14}^{(1)}, \ldots, x_{16}^{(1)} \in \mathcal{X}_2 \\ x_1^{(1)}, \ldots, x_2^{(1)}, x_9^{(1)}, \ldots, x_{11}^{(1)}, x_{14}^{(1)}, \ldots, x_{16}^{(1)}}} \sum_{m=1}^{2} \begin{bmatrix} U_1(x_1^{(1)}) + p_5^{(m)} x_1^{(m)} + \\ U_2(x_2^{(2)}) + p_1^{(m)} x_2^{(m)} - \\ p_2^{(m)} x_{14}^{(m)} - p_3^{(m)} x_{15}^{(m)} - \\ p_4^{(m)} x_{16}^{(m)} \end{bmatrix},$$

and $\chi_1$ corresponds to constraints (45)-(47) and subset of constraints (56) corresponding to arcs $a_3, \ldots, a_8, a_{12}, a_{13}$ and $\mathcal{X}_2$ corresponds to constraints (48)-(50) subset of constraints (56) corresponding to arcs $a_1, a_2, a_9, \ldots, a_{11}, a_{14}, \ldots, a_{16}$. $\hat{x}_1(p)$ and $\hat{x}_2(p)$ are used to denote the solutions of $L_1(p)$ and $L_2(p)$, respectively.

The partitioned algorithm uses the gradient descent algorithm on the dual problem. The algorithm proceeds in iterations. In iteration k, it is possible to have a set of $p_k$, and perform the following steps: Solve $L_1(p_k)$ and $L_2(p_k)$ to obtain $\hat{x}_1(p)$ and $\hat{x}_2(p)$, respectively. Use $\hat{x}_1(p)$ and $\hat{x}_2(p)$ to calculate $$\frac{\partial}{\partial p} L(p_k).$$

Obtain $p_{k+1}$ with $$p_{k+1} = p_k - \alpha_k \frac{\partial}{\partial p} L(p_k),$$

where $\alpha_k$ is the step size in the iteration k.

Figure 19:
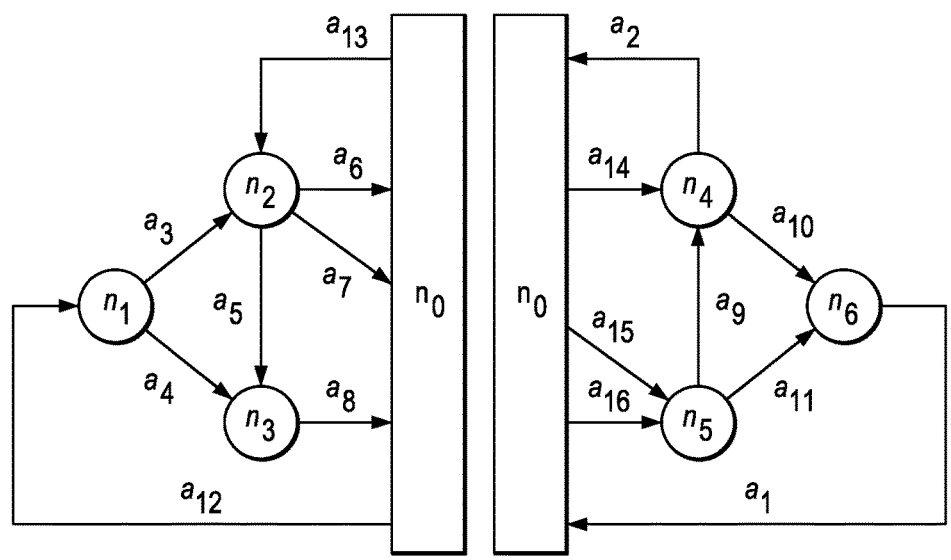
FIG. 19 illustrates a diagram of yet another embodiment hierarchical SDN configuration.

FIG. 19 illustrates a Graph representation of the partitioned problem. From that, it is possible to obtain the following:

$$\min - \sum_{a_j \in \mathcal{A}_f} f^{(m)}(x_j^{(m)});\qquad(57)$$

$$\sum_{a_j \in n_i^{(in)}} x_j^{(m)} - \sum_{a_j \in n_i^{(out)}} x_j^{(m)} = 0, n_i \in \mathcal{N}_p,\qquad(58)$$

$$m = 1, \ldots, M, p = 1, \ldots, P;$$

$$\sum_{m=1}^{M} x_j^{(m)} \le C_j, a_j \in \mathcal{A}_p, p = 1, \ldots, P;\qquad(59)$$

$$x_j^{(m)} \ge 0, a_j \in \mathcal{A}_p;\qquad(60)$$

$$x_i^{(m)} - x_{C+i}^{(m)} = 0, n_i \in \mathcal{N}_c, m = 1, \ldots, M;\qquad(61)$$

$$\sum_{m=1}^{M} x_i^{(m)} \le C_i, n_i \in \mathcal{A}_c, \text{s.t. } n_i \in \mathcal{N}_c;\qquad(62)$$

$$x_j^{(m)} \ge 0, a_j \in \mathcal{A} \cup \mathcal{A}_f, m = 1, \ldots, M.\qquad(63)$$

To simplify notation, it is possible to denote the set of flows in a partition corresponding the arc set $\mathcal{A}_p$ with $X_p$. It is possible to use the notation $X_p \in F_p$ to indicate that a set of flow in the partition satisfies (58)-(60), where with $F_p$ is the set of all flows satisfying (58)-(60).

$$L(\gamma, \lambda, \mu) = \min_{X_p \in F_p, p=1,\ldots,P} \left\{ -\sum_{a_j \in \mathcal{A}_f} f_j(x_j^{(m)}) + \sum_{n_i \in \mathcal{N}_f} \gamma_i(x_i^{(m)} - x_{C+i}^{(m)}) + \sum_{n_i \in \mathcal{N}_c} \left[ \lambda_i \left( C_i - \sum_{m=1}^{M} x_i^{(m)} \right) + \mu_i(x_i^{(m)} - x_{C+i}^{(m)}) \right] \right\}.$$

Figure 20:
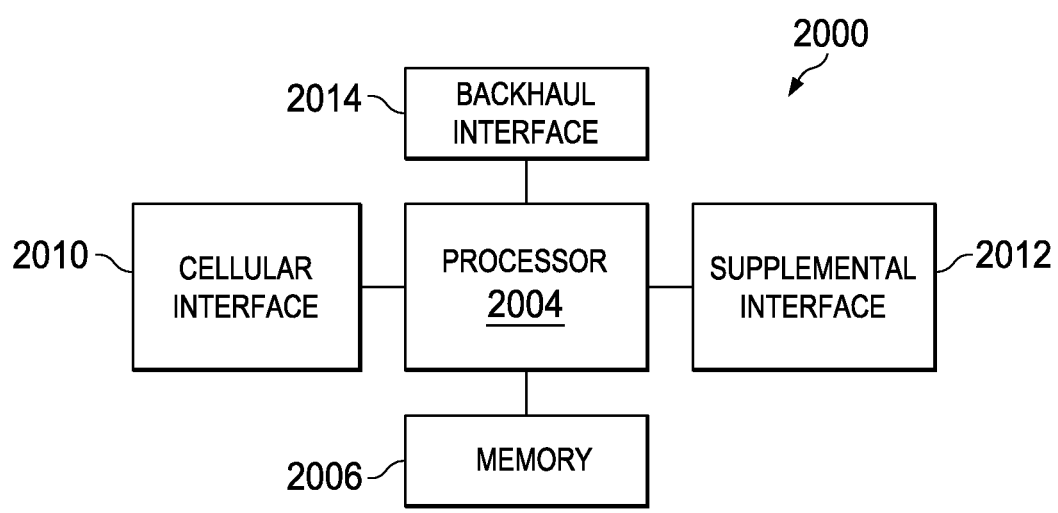
FIG. 20 illustrates a block diagram of an embodiment communications device.

FIG. 20 illustrates a block diagram of an embodiment of a communications device 2000, which may be equivalent to one or more devices (e.g., a controller, etc.) discussed above. The communications device 2000 may include a processor 2004, a memory 2006, a cellular interface 2010, a supplemental interface 2012, and a backhaul interface 2014, which may (or may not) be arranged as shown in FIG. 20. The processor 2004 may be any component capable of performing computations and/or other processing related tasks, and the memory 2006 may be any component capable of storing programming and/or instructions for the processor 2004. The cellular interface 2010 may be any component or collection of components that allows the communications device 2000 to communicate using a cellular signal, and may be used to receive and/or transmit information over a cellular connection of a cellular network. The supplemental interface 2012 may be any component or collection of components that allows the communications device 2000 to communicate data or control information via a supplemental protocol. For instance, the supplemental interface 2012 may be a non-cellular wireless interface for communicating in accordance with a Wireless-Fidelity (Wi-Fi) or Bluetooth protocol. Alternatively, the supplemental interface 2012 may be a wireline interface. The backhaul interface 2014 may be optionally included in the communications device 2000, and may comprise any component or collection of components that allows the communications device 2000 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for operating hierarchical software defined network (SDN) controllers, the method comprising:
    receiving, by a parent SDN controller, regional information from one or more child SDN controllers, wherein the parent SDN controller is at a higher tier in a hierarchical SDN network architecture than the one or more child SDN controllers, wherein each of the one or more child SDN controllers are assigned a different SDN region in an SDN domain assigned to the parent SDN controller, and wherein the parent SDN controller communicates with the child SDN controllers using an SDN protocol via an SDN control plane, the parent SDN controller and the one or more child SDN controllers all being part of the SDN control plane, the SDN domain including a first region assigned to a first child SDN controller and a second region assigned to a second child SDN controller;
    computing cost-based parameters in accordance with the regional information, the cost-based parameters being computed at least by estimating Lagrangian variables for a coupling constraint in accordance with the regional information, the coupling constraint being associated with an inter-region link extending between the first region and the second region; and
    sending, by the parent SDN controller, the cost-based parameters to the one or more child SDN controllers, wherein the cost-based parameters are configured to be used in performing distributed network resource allocation in each of different regions of the SDN domain.

2. The method of claim 1, wherein sending the cost-based parameters to the one or more child SDN controllers comprises:
    sending a first sub-set of the cost-based parameters to the first child SDN controller; and
    sending a second sub-set of the cost-based parameters to the second child SDN controller, wherein the coupling constraint is included in both the first sub-set of cost-based parameters and the second sub-set of the cost-based parameters.

3. The method of claim 2, wherein the first sub-set of the cost-based parameters include at least one parameter that is excluded from the second sub-set of the cost-based parameters.

4. The method of claim 1, wherein computing the cost-based parameters comprise:
identifying the Lagrangian variable estimates in the regional information; and
computing cost-based parameters in accordance with the identified Lagrangian variable estimates.

5. The method of claim 1, further comprising:
receiving, by the parent SDN controller, network information from network components that are located in the SDN domain but excluded from the different regions; and
allocating, by the parent SDN controller, network resources to the network components in accordance with the network information and the regional information.

6. The method of claim 1, further comprising:
receiving, by the parent SDN controller, network information from network components that are located in the SDN domain but excluded from the different regions; and
consolidating, by the parent SDN controller, the network information and the regional information into domain information;
sending, by the parent SDN controller, the domain information to a higher order SDN controller;
receiving, by the parent SDN controller, domain cost-based parameters from the higher order SDN controller; and
allocating, by the parent SDN controller, network resources to the network components in accordance with the network information, the regional information, and the domain cost-based parameters.

7. The method of claim 6, wherein computing the cost-based parameters comprises:
computing the cost-based parameters in accordance with regional information and the domain cost-based parameters.

8. The method of claim 1, wherein each of the different regions corresponds to a different geographical area within the domain.

9. The method of claim 1, wherein each of the different regions corresponds to a different virtual network region in the domain, and wherein each virtual network region corresponds to a group of traffic flows.

10. A parent software defined network (SDN) controller assigned to an SDN domain of a network, the parent SDN controller comprising:
a processor; and
a computer readable storage device storing programming for execution by the processor, the programming including instructions to:
receive regional information from one or more child SDN controllers, wherein the parent SDN controller is at a higher tier in a hierarchical SDN network architecture than the one or more child SDN controllers, wherein each of the one or more child SDN controllers are assigned a different SDN region in the SDN domain, and wherein the parent SDN controller communicates with the child SDN controllers using an SDN protocol via an SDN control plane, the parent SDN controller and the one or more child SDN controllers all being part of the SDN control plane, the domain including a first region assigned to a first child SDN controller and a second region assigned to a second child SDN controller;
compute cost-based parameters in accordance with the regional information, the cost-based parameters being computed at least by estimating Lagrangian variables for a coupling constraint in accordance with the regional information, the coupling constraint being associated with an inter-region link extending between the first region and the second region; and
send the cost-based parameters to the one or more child SDN controllers, wherein the cost-based parameters are configured to be used in performing distributed network resource allocation in each of different regions of the domain.

11. A method for operating hierarchical software defined network (SDN) controllers, the method comprising:
receiving, by a child SDN controller, network information from network elements in an SDN region assigned to the child SDN controller, the SDN region being included in an SDN domain assigned to a parent SDN controller, wherein the parent SDN controller is at a higher tier in a hierarchical SDN network architecture than the child SDN controller, and wherein the parent SDN controller communicates with the child SDN controller using an SDN protocol via an SDN control plane, the parent SDN controller and the child SDN controller both being part of the SDN control plane, the domain including the SDN region and a second region assigned to a second child SDN controller;
consolidating, by the child SDN controller, the network information into regional information;
reporting, by the child SDN controller, the regional information to the parent SDN controller;
receiving, by the child SDN controller, a set of cost-based parameters from the parent SDN controller, the set of cost-based parameters being computed by the parent SDN controller at least by estimating Lagrangian variables for a coupling constraint in accordance with the SDN regional information, the coupling constraint being associated with an inter-region link extending between the SDN region and the second region; and
allocating, by the child SDN controller, network resources to the network elements in accordance with the set of cost-based parameters.

12. The method of claim 11, wherein the network information includes at least one of channel quality indicator (CQI) measurements and buffer status reports.

13. The method of claim 11, wherein allocating the network resources to the network elements in accordance with the set of cost-based parameters comprises:
setting forwarding information base (FIB) tables in at least some of the network elements.

14. The method of claim 11, wherein allocating the network resources to the network elements in accordance with the set of cost-based parameters comprises:
establishing traffic flow priorities for at least some of the network elements.

15. The method of claim 11, wherein the SDN region corresponds to a geographical region within the domain.

16. The method of claim 11, wherein the SDN region corresponds to a virtual network region in the domain, the virtual network region corresponds to a group of traffic flows.

17. A child software defined network (SDN) controller assigned to an SDN region of a network, the child SDN controller comprising:

a processor; and a computer readable storage device storing programming for execution by the processor, the programming including instructions to:

receive network information from network elements in the SDN region assigned to the child SDN controller, wherein a parent SDN controller is at a higher tier in a hierarchical SDN network architecture than the child SDN controller, wherein the SDN region is included in an SDN domain assigned to the parent SDN controller, and wherein the parent SDN controller communicates with the child SDN controller using an SDN protocol via an SDN control plane, the parent SDN controller and the child SDN controller both being part of the SDN control plane, the domain including the SDN region and a second region assigned to a second child SDN controller;

consolidate the network information into regional information;

report the regional information to the parent SDN controller;

receive a set of cost-based parameters from the parent SDN controller, the set of cost-based parameters being computed by the parent SDN controller at least by estimating Lagrangian variables for a coupling constraint in accordance with the regional information, the coupling constraint being associated with an inter-region link extending between the SDN region and the second region; and allocate network resources to the network elements in accordance with the set of cost-based parameters.

18. The child SDN controller of claim 17, wherein the network information includes at least one of channel quality indicator (CQI) measurements and buffer status reports.

19. The parent SDN controller of claim 10, wherein the programming further including instructions to:

receive network information from network components that are located in the domain but excluded from the different regions; and allocate network resources to the network components in accordance with the network information and the regional information.

20. The method of claim 5, wherein the network information includes at least one of channel quality indicator (CQI) measurements and buffer status reports.

* * * * *